(12) United States Patent
Sugiyama et al.

(10) Patent No.: US 7,675,587 B2
(45) Date of Patent: Mar. 9, 2010

(54) POLARIZING PLATE AND PROCESS FOR PRODUCING THE SAME

(75) Inventors: Naoki Sugiyama, Chuo-ku (JP); Tatsuya Hirono, Chuo-ku (JP); Masayuki Sekiguchi, Chuo-ku (JP)

(73) Assignee: JSR Corporation, Tokyo (JP)

( * ) Notice: Subject to any disclaimer, the term of this patent is extended or adjusted under 35 U.S.C. 154(b) by 1018 days.

(21) Appl. No.: 11/194,555

(22) Filed: Aug. 2, 2005

(65) Prior Publication Data

US 2006/0027322 A1 Feb. 9, 2006

(30) Foreign Application Priority Data

| Aug. 3, 2004 | (JP) | ............................ 2004-227287 |
| Dec. 20, 2004 | (JP) | ............................ 2004-367117 |
| Apr. 22, 2005 | (JP) | ............................ 2005-124558 |

(51) Int. Cl.
*G02F 1/1335* (2006.01)
*B32B 17/40* (2006.01)

(52) U.S. Cl. .................... 349/96; 428/423.1; 428/424.4

(58) Field of Classification Search ............. 428/423.1, 428/424.4; 353/20; 349/96

See application file for complete search history.

(56) References Cited

U.S. PATENT DOCUMENTS 6,552,145 B1 * 4/2003 Okada et al. ................. 526/281
6,808,811 B1 * 10/2004 Sawada et al. ........... 428/424.8

FOREIGN PATENT DOCUMENTS

| JP | 2003 149403 | 5/2003 |
| JP | 2003 279744 | 10/2003 |
| JP | 2004 037841 | 2/2004 |
| WO | WO 01/25826 | 4/2001 |

OTHER PUBLICATIONS

U.S. Appl. No. 10/581,523, filed Jun. 2, 2006, Sekiguchi, et al.
U.S. Appl. No. 10/581,524, filed Jun. 2, 2006, Hirono, et al.

* cited by examiner

*Primary Examiner*—Thao T. Tran
(74) *Attorney, Agent, or Firm*—Oblon, Spivak, McClelland, Maier & Neustadt, L.L.P.

(57) ABSTRACT

The polarizing plate of the invention comprises a norbornene resin film, a polyurethane layer, an adhesive layer and a polarizing film which are laminated in this order. The polarizing plate exhibits excellent adhesion between the optical film and the polarizing film, is excellent also in properties such as heat resistance and chemical resistance, rarely suffers delamination and distortion even if it is used for a long period of time, and has high reliability. The polarizing plate can be obtained by, for example, a process comprising steps of forming a polyurethane layer on a surface of a norbornene resin film and bonding a polarizing film to the polyurethane layer through an adhesive.

6 Claims, No Drawings

POLARIZING PLATE AND PROCESS FOR PRODUCING THE SAME

TECHNICAL FIELD

The present invention relates to a polarizing plate and a process for producing the same. Particularly, the invention relates to a polarizing plate comprising a norbornene resin film and a polarizing film which are bonded with high strength and a process for producing the polarizing plate.

BACKGROUND OF THE INVENTION

Polarizing plates (polarizing films) for use in liquid crystal displays and the like are each usually formed from a substrate (optical film) of excellent transparency and a polarizing film (polarizer). The polarizing plates may be formed from a film (retardation film) obtained by stretching an optical film and having a function of imparting retardation to transmitted light and a polarizing film.

As the optical films used for substrates or retardation films of the polarizing plates, polycarbonate films, polyester films, acetate films, etc. have been heretofore used. Polarizing plates using the polycarbonate films or the polyester films, however, have a large photoelastic coefficient and sometimes change retardation to be imparted to transmitted light because of a little change of stress or the like. The acetate films have low heat resistance and high water absorption, so that polarizing plates using them have a problem that the polarizing plates are liable to be distorted depending upon the environment where the plates are used.

On the other hand, norbornene resins have been paid attention as materials of various optical parts because of their excellent transparency, heat resistance and chemical resistance. In Japanese Patent Laid-Open Publication No. 6-51117/1994, a polarizing film (polarizing plate) wherein a norbornene resin sheet is laminated as a protective film on a polarizing film has been proposed.

The norbornene resins, however, have bad adhesion properties to other resin materials, so that it was difficult to produce polarizing plates using norbornene resin films. Further, there is a problem that delamination is liable to take place when they are used for a long period of time. Moreover, in order to improve scratch resistance and antireflection properties, one surface of the polarizing plate is sometimes subjected to surface treatment such as hard coating treatment, and also in this case, there is a problem that separation takes place in the long-term use. On this account, development of polarizing plates using norbornene resin films and having excellent adhesion properties has been eagerly desired.

OBJECT OF THE INVENTION

It is an object of the present invention to provide a polarizing plate, which exhibits excellent adhesion between the optical film and the polarizing film, is excellent also in properties, such as heat resistance and chemical resistance, rarely suffers delamination and distortion even if it is used for a long period of time, and has high reliability, and a process for producing the polarizing plate.

DISCLOSURE OF THE INVENTION

The polarizing plate of the invention comprises a norbornene resin film, a polyurethane layer, an adhesive layer and a polarizing film which are laminated in this order.

The norbornene resin film preferably comprises a resin obtained by (co)polymerizing a monomer comprising at least one compound represented by the following formula:

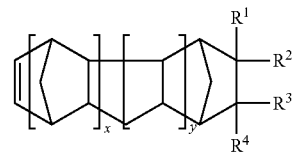

(1)

wherein $R^1$ to $R^4$ are each independently a hydrogen atom, a halogen atom or a monovalent group which may contain oxygen, nitrogen, sulfur or silicon; $R^1$ and $R^2$, or $R^3$ and $R^4$ may be bonded to each other to form an alkylidene group, or $R^1$ and $R^2$, $R^3$ and $R^4$, or $R^2$ and $R^3$ may be bonded to each other to form a mono- or poly-carbocyclic ring or a mono- or poly-heterocyclic ring; and x is 0 or an integer of 1 to 3, and y is 0 or 1, with the proviso that when x is 0, y is also 0.

The norbornene resin film is preferably a retardation film.

The polyurethane layer preferably comprises polyurethane resin obtained by reacting polyether polyol with a polyisocyanate.

The adhesive layer preferably comprises a polyvinyl alcohol adhesive.

The process for producing a polarizing plate of the invention comprises steps of forming a polyurethane layer on a surface of a norbornene resin film, and bonding a polarizing film to the polyurethane layer through an adhesive. The process for producing a polarizing plate preferably further comprises a step of subjecting the surface of the norbornene resin film to corona discharge treatment.

DESCRIPTION OF THE PREFERRED EMBODIMENTS

The present invention is described in detail hereinafter.

The polarizing plate of the invention comprises a norbornene resin film, a polyurethane layer, an adhesive layer and a polarizing film.

Norbornene Resin Film

A norbornene resin to constitute the norbornene resin film for use in the invention is a resin obtained by (co)polymerizing a monomer composition comprising at least one norbornene compound or a resin obtained by optionally hydrogenating the resin.

(Monomer Composition)

The norbornene compound used for the monomer composition is, for example, a norbornene compound represented by the following formula (1).

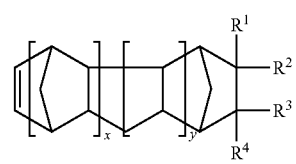

(1)

In the formula (1), $R^1$ to $R^4$ are each independently a hydrogen atom, a halogen atom or a monovalent group which may contain oxygen, nitrogen, sulfur or silicon. The monovalent group is, for example, a monovalent organic group, a cyano group or an amino group. The monovalent organic group is, for example, a substituted or unsubstituted hydrocarbon group of 1 to 15 carbon atoms, which may have a bond group containing oxygen, nitrogen, sulfur or silicon. x is 0 or an integer of 1 to 3, and y is 0 or 1. When x is 0, y is also 0.

$R^1$ and $R^2$, or $R^3$ and $R^4$ may be bonded to each other to form an alkylidene group, or $R^1$ and $R^2$, $R^3$ and $R^4$, or $R^2$ and $R^3$ may be bonded to each other to form a mono- or poly-carbocyclic ring or a mono- or poly-heterocyclic ring. The expression "$R^1$ and $R^2$ may be bonded to each other to form an alkylidene group" means a structure where one of $R^1$ and $R^2$ is eliminated and the other is bonded to a cyclic structure by a double bond (following formula (1')). Also in case of $R^3$ and $R^4$, the same shall apply. The carbocyclic ring or the heterocyclic ring is, for example, an alicyclic or aromatic ring.

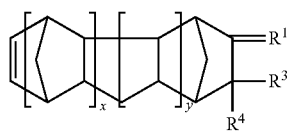

(1')

In the formula (1'), $R^1$, $R^3$, $R^4$, x and y have the same meanings as those of $R^1$, $R^3$, $R^4$, x and y in the formula (1).

Examples of the norbornene compounds represented by the formula (1) include the following compounds, without limiting thereto.
Bicyclo[2.2.1]hept-2-ene (norbornene),
5-methyl-bicyclo[2.2.1]hept-2-ene,
5-ethyl-bicyclo[2.2.1]hept-2-ene,
5-cyclohexyl-bicyclo[2.2.1]hept-2-ene,
5-phenyl-bicyclo[2.2.1]hept-2-ene,
5-(4-biphenyl)-bicyclo[2.2.1]hept-2-ene,
5-methoxycarbonyl-bicyclo[2.2.1]hept-2-ene,
5-phenoxycarbonyl-bicyclo[2.2.1]hept-2-ene,
5-phenoxyethylcarbonyl-bicyclo[2.2.1]hept-2-ene,
5-phenylcarbonyloxy-bicyclo[2.2.1]hept-2-ene,
5-methyl-5-methoxycarbonyl-bicyclo[2.2.1]hept-2-ene,
5-methyl-5-phenoxycarbonyl-bicyclo[2.2.1]hept-2-ene,
5-methyl-5-phenoxyethylcarbonyl-bicyclo[2.2.1]hept-2-ene,
5-vinyl-bicyclo[2.2.1]hept-2-ene,
5-ethylidene-bicyclo[2.2.1]hept-2-ene,
5,5-dimethyl-bicyclo[2.2.1]hept-2-ene,
5,6-dimethyl-bicyclo[2.2.1]hept-2-ene,
5-fluoro-bicyclo[2.2.1]hept-2-ene,
5-chloro-bicyclo[2.2.1]hept-2-ene,
5-bromo-bicyclo[2.2.1]hept-2-ene,
5,6-difluoro-bicyclo[2.2.1]hept-2-ene,
5,6-dichloro-bicyclo[2.2.1]hept-2-ene,
5,6-dibromo-bicyclo[2.2.1]hept-2-ene,
5-hydroxy-bicyclo[2.2.1]hept-2-ene,
5-hydroxyethyl-bicyclo[2.2.1]hept-2-ene,
5-cyano-bicyclo[2.2.1]hept-2-ene,
5-amino-bicyclo[2.2.1]hept-2-ene,
tricyclo[4.3.0.1$^{2,5}$]dec-3-ene,
tricyclo[4.4.0.1$^{2,5}$]undec-3-ene,
7-methyl-tricyclo[4.3.0.1$^{2,5}$]dec-3-ene,
7-ethyl-tricyclo[4.3.0.1$^{2,5}$]dec-3-ene,
7-cyclohexyl-tricyclo[4.3.0.1$^{2,5}$]dec-3-ene,
7-phenyl-tricyclo[4.3.0.1$^{2,5}$]dec-3-ene,
7-(4-biphenyl)-tricyclo[4.3.0.1$^{2,5}$]dec-3-ene,
7,8-dimethyl-tricyclo[4.3.0.1$^{2,5}$]dec-3-ene,
7,8,9-trimethyl-tricyclo[4.3.0.1$^{2,5}$]dec-3-ene,
8-methyl-tricyclo[4.4.0.1$^{2,5}$]undec-3-ene,
8-phenyl-tricyclo[4.4.0.1$^{2,5}$]undec-3-ene,
7-fluoro-tricyclo[4.3.0.1$^{2,5}$]dec-3-ene,
7-chloro-tricyclo[4.3.0.1$^{2,5}$]dec-3-ene,
7-bromo-tricyclo[4.3.0.1$^{2,5}$]dec-3-ene,
7,8-dichloro-tricyclo[4.3.0.1$^{2,5}$]dec-3-ene,
7,8,9-trichloro-tricyclo[4.3.0.1$^{2,5}$]dec-3-ene,
7-chloromethyl-tricyclo[4.3.0.1$^{2,5}$]dec-3-ene,
7-dichloromethyl-tricyclo[4.3.0.1$^{2,5}$]dec-3-ene,
7-trichloromethyl-tricyclo[4.3.0.1$^{2,5}$]dec-3-ene,
7-hydroxy-tricyclo[4.3.0.1$^{2,5}$]dec-3-ene,
7-cyano-tricyclo[4.3.0.1$^{2,5}$]dec-3-ene,
7-amino-tricyclo[4.3.0.1$^{2,5}$]dec-3-ene,
tetracyclo[4.4.0.1$^{2,5}$.1$^{7,10}$]dodec-3-ene,
pentacyclo[7.4.0.1$^{2,5}$.1$^{8,11}$.0$^{7,12}$]pentadec-3-ene,
hexacyclo[8.4.0.1$^{2,5}$.1$^{7,14}$.1$^{9,12}$.0$^{8,13}$]heptadec-3-ene,
8-methyl-tetracyclo[4.4.0.1$^{2,5}$.1$^{7,10}$]dodec-3-ene,
8-ethyl-tetracyclo[4.4.0.1$^{2,5}$.1$^{7,10}$]dodec-3-ene,
8-cyclohexyl-tetracyclo[4.4.0.1$^{2,5}$.1$^{7,10}$]dodec-3-ene,
8-phenyl-tetracyclo[4.4.0.1$^{2,5}$.1$^{7,10}$]dodec-3-ene,
8-(4-biphenyl)-tetracyclo[4.4.0.1$^{2,5}$.1$^{7,10}$]dodec-3-ene,
8-methoxycarbonyl-tetracyclo[4.4.0.1$^{2,5}$.1$^{7,10}$]dodec-3-ene,
8-phenoxycarbonyl-tetracyclo[4.4.0.1$^{2,5}$.1$^{7,10}$]dodec-3-ene,
8-phenoxyethylcarbonyl-tetracyclo[4.4.0.1$^{2,5}$.1$^{7,10}$]dodec-3-ene,
8-phenylcarbonyloxy-tetracyclo[4.4.0.1$^{2,5}$.1$^{7,10}$]dodec-3-ene,
8-methyl-8-methoxycarbonyl-tetracyclo[4.4.0.1$^{2,5}$.1$^{7,10}$]dodec-3-ene,
8-methyl-8-phenoxycarbonyl-tetracyclo[4.4.0.1$^{2,5}$.1$^{7,10}$]dodec-3-ene,
8-methyl-8-phenoxyethylcarbonyl-tetracyclo[4.4.0.1$^{2,5}$.1$^{7,10}$]dodec-3-ene,
8-vinyl-tetracyclo[4.4.0.1$^{2,5}$.1$^{7,10}$]dodec-3-ene,
8-ethylidene-tetracyclo[4.4.0.1$^{2,5}$.1$^{7,10}$]dodec-3-ene,
8,8-dimethyl-tetracyclo[4.4.0.1$^{2,5}$.1$^{7,10}$]dodec-3-ene,
8,9-dimethyl-tetracyclo[4.4.0.1$^{2,5}$.1$^{7,10}$]dodec-3-ene,
8-fluoro-tetracyclo[4.4.0.1$^{2,5}$.1$^{7,10}$]dodec-3-ene, 8-chloro-tetracyclo[4.4.0.1$^{2,5}$.1$^{7,10}$]dodec-3-ene,
8-bromo-tetracyclo[4.4.0.1$^{2,5}$.1$^{7,10}$]dodec-3-ene,
8,8-dichloro-tetracyclo[4.4.0.1$^{2,5}$.1$^{7,10}$]dodec-3-ene,
8,9-dichloro-tetracyclo[4.4.0.1$^{2,5}$.1$^{7,10}$]dodec-3-ene,
8,8,9,9-tetrachloro-tetracyclo[4.4.0.1$^{2,5}$.1$^{7,10}$]dodec-3-ene,
8-hydroxy-tetracyclo[4.4.0.1$^{2,5}$.1$^{7,10}$]dodec-3-ene,
8-hydroxyethyl-tetracyclo[4.4.0.1$^{2,5}$.1$^{7,10}$]dodec-3-ene,
8-methyl-8-hydroxyethyl-tetracyclo[4.4.0.1$^{2,5}$.1$^{7,10}$]dodec-3-ene, and
8-cyano-tetracyclo[4.4.0.1$^{2,5}$.1$^{7,10}$]dodec-3-ene.

The norbornene compounds represented by the formula (1) may be used singly or in combination of two or more kinds.

The type and the amount of the norbornene compound used in the invention are properly selected according to the desired properties of the resulting resin.

Of these compounds, compounds having a structure (referred to as a "polar structure" hereinafter) containing at least one atom selected from an oxygen atom, a nitrogen atom, a sulfur atom and a silicon atom in the molecule are preferable because they have excellent bond properties or adhesion properties to another material. In particular, compounds of the formula (1) wherein $R^1$ and $R^3$ are each a hydrogen atom or a hydrocarbon group of 1 to 3 carbon atoms, preferably a hydrogen atom or a methyl group, and one of $R^2$ and $R^4$ is a group having a polar structure and the other is a hydrogen atom or a hydrocarbon group of 1 to 3 carbon atoms are preferable because the resulting resin has low water (moisture) absorbing properties. Further, norbornene compounds wherein the group having a polar structure is a group represented by the following formula (2) are preferably used because the resulting resin is liable to balance between heat resistance and water (moisture) absorbing properties.

$$—(CH_2)_z COOR \quad (2)$$

In the formula (2), R is a substituted or unsubstituted hydrocarbon group of 1 to 15 carbon atoms, and z is 0 or an integer of 1 to 10.

As the value for z in the formula (2) is decreased, a hydrogenation product of the resulting polymer has a higher glass transition temperature and exhibits more excellent heat resistance, so that z is preferably 0 or an integer of 1 to 3. Further, a monomer wherein z is 0 is particularly preferable from the viewpoint that synthesis of the monomer is easy. As the number of carbon atoms of R in the formula (2) is increased, water (moisture) absorbing properties of a hydrogenation product of the resulting polymer tend to be lowered, but a glass transition temperature thereof tends to be also lowered, so that from the viewpoint of retention of heat resistance, R is preferably a hydrocarbon group of 1 to 10 carbon atoms, particularly preferably a hydrocarbon group of 1 to 6 carbon atoms.

A compound of the formula (1) wherein an alkyl group of 1 to 3 carbon atoms, particularly a methyl group, is bonded to a carbon atom to which the group represented by the formula (2) is bonded is preferable from the viewpoint of a balance between heat resistance and water (moisture) absorbing properties. Further, a compound of the formula (1) wherein x is 0 or 1 and y is 0 is favorably used because the compound has high reactivity, a polymer is obtained with high yield, a hydrogenation product of the polymer having high heat resistance is obtained, and the compound can be easily obtained industrially.

For obtaining the norbornene resin for use in the invention, within limits not detrimental to the effects of the present invention, the monomer composition can contain a monomer copolymerizable with the norbornene compound and can be polymerized.

Examples of the copolymerizable monomers include cycloolefins, such as cyclobutene, cyclopentene, cycloheptene, cyclooctene and cyclododecene; and non-conjugated cyclic polyenes, such as 1,4-cyclooctadiene, dicyclopentadiene and cyclododecatriene.

These copolymerizable monomers may be used singly or in combination of two or more kinds.

(Polymerization Process)

The polymerization process of the norbornene resin for use in the invention is not specifically restricted so long as the monomer composition containing the norbornene compound can be polymerized, and for example, the monomer composition can be polymerized by ring-opening polymerization or addition polymerization.

(A) Ring-Opening Polymerization

Production of a polymer by ring-opening polymerization can be carried out by a publicly known ring-opening polymerization reaction of a norbornene compound, and specifically, the monomer composition containing the norbornene compound is ring-opening polymerized using a polymerization catalyst, a polymerization reaction solvent, and if necessary, a molecular weight modifier, whereby a polymer can be produced.

(a) Polymerization Catalyst

When the monomer composition is polymerized by ring-opening (co)polymerization reaction in the invention, it is preferable to carry out the polymerization in the presence of a metathesis catalyst.

The metathesis catalyst is a catalyst comprising a combination of:

(A) at least one compound (referred to as a "compound (A)" hereinafter) selected from compounds having W, Mo and Re, and (B) at least one compound (referred to as a "compound (B)" hereinafter) selected from compounds which have Group IA elements of Deming's periodic table (e.g., Li, Na, K), Group IIA elements thereof (e.g., Mg, Ca), Group IIB elements thereof (e.g., Zn, Cd, Hg), Group IIIA elements thereof (e.g., B, Al), Group IVA elements thereof (e.g., Si, Sn, Pb) or Group IVB elements thereof (e.g., Ti, Zr) and have at least one bond of the above element-to-carbon or at least one bond of the above element-to-hydrogen. In order to enhance activity of the catalyst, the later-described additives (C) may be further added.

Examples of the compounds (A) include halides, oxyhalides, alkoxyhalides, alkoxides, carboxylates, (oxy)acetylacetonates, carbonyl complexes, acetonitrile complexes and hydride complexes of W, Mo or Re, derivatives thereof, and combinations thereof. Of these, compounds of W and Mo are preferable, and their halides, oxyhalides and alkoxyhalides are particularly preferable, from the viewpoints of polymerization activity and practical usability. Further, a mixture of two or more compounds which react with each other to form the above compound may be employed. The above compounds may be complexed by an appropriate complexing agent such as $P(C_6H_5)_5$ or $C_5H_5N$.

Specific examples of the compounds (A) include $WCl_6$, $WCl_5$, $WCl_4$, $WBr_6$, $WF_6$, $WI_6$, $MoCl_5$, $MoCl_4$, $MoCl_3$, $ReCl_3$, $WOCl_4$, $MoOCl_3$, $ReOCl_3$, $ReOBr_3$, $W(OC_6H_5)_6$, $WCl_2(OC_6H_5)_4$, $Mo(OC_2H_5)_2Cl_3$, $Mo(OC_2H_5)_5$, $MoO_2(acac)_2$, $W(OCOR)_5$, $W(OC_2H_5)_2Cl_3$, $W(CO)_6$, $Mo(CO)_6$, $Re_2(CO)_{10}$, $ReOBr_3.P(C_6H_5)_3$, $WCl_5.P(C_6H_5)_3$, $WCl_6.C_5H_5N$, $W(CO)_5.P(C_6H_5)_3$ and $W(CO)_3.(CH_3CN)_3$. Particularly preferable examples of these compounds (A) include $MoCl_5$, $Mo(OC_2H_5)_2Cl_3$, $WCl_6$ and $W(OC_2H_5)_2Cl_3$.

Specific examples of the compounds (B) include n-$C_4H_5Li$, n-$C_5H_{11}Na$, $C_5H_5Na$, $CH_3MgI$, $C_2H_5MgBr$, $CH_3MgBr$, n-$C_3H_7MgCl$, $(C_6H_5)_3Al$, t-$C_4H_9MgCl$, $CH_2$=$CHCH_2MgCl$, $(C_2H_5)_2Zn$, $(C_2H_5)_2Cd$, $CaZn(C_2H_5)_4$, $(CH_3)_3B$, $(C_2H_5)_3B$, (n-$C_4H_9)_3B$, $(CH_3)_3Al$, $(CH_3)_2AlCl$, $(CH_3)_3Al_2Cl_3$, $CH_3AlCl_2$, $(C_2H_5)_3Al$, $LiAl(C_2H_5)_2$, $(C_2H_5)_3Al$—$O(C_2H_5)_2$, $(C_2H_5)_2AlCl$, $C_2H_5AlCl_2$, $(C_2H_5)_2AlH$, (iso-$C_4H_9)_2AlH$, $(C_2H_5)_2AlOC_2H_5$, (iso-$C_4H_9)_3Al$, $(C_2H_5)_3Al_2Cl_3$, $(CH_3)_4Ga$, $(CH_3)_4Sn$, (n-$C_4H_9)_4Sn$, $(C_2H_5)_3SiH$, (n-$C_6H_{13})_3Al$, (n-$C_4H_{17})_3Al$, $LiH$, $NaH$, $B_2H_6$, $NaBH_4$, $AlH_3$, $LiAlH_4$, $BiH_4$ and $TiH_4$. Further, a mixture of two or more compounds which react with each other to form the above compound is also employable. Particularly preferable examples of these compounds (A) include $(CH_3)_3Al$, $(CH_3)_2AlCl$, $(CH_3)_3Al_2Cl_3$, $CH_3AlCl_2$, $(C_2H_5)_3Al$, $(C_2H_5)_2AlCl$, $(C_2H_5)_{1.5}AlCl_{1.5}$, $C_2H_5AlCl_2$, $(C_2H_5)_2AlH$, $(C_2H_5)_2AlOC_2H_5$, $(C_2H_5)_2AlCN$, $(C_3H_7)_3Al$, (iso-$C_4H_9)_3Al$, (iso-$C_4H_9)_2AlH$, $(C_6H_{13})_3Al$, $(C_8H_{17})_3Al$ and $(C_6H_5)_5Al$.

As the additives (C) employable with the compound (A) and the compound (B), alcohols, aldehydes, ketones, amines, etc. are preferable. Examples of such additives include the following substances (1) to (9):

(1) boron alone, non-organometallic compounds of boron, such as $BF_3$, $BCl_3$, $B(O$-n-$C_4H_9)_3$, $(C_2H_5O_3)_2$, $BF$, $B_2O_3$ and $H_3BO_3$, and non-organometallic compounds of silicon, such as $Si(OC_2H_5)_4$;

(2) alcohols, hydroperoxides and peroxides;

(3) water;

(4) oxygen;

(5) carbonyl compounds, such as aldehyde and ketone, and polymerization products thereof;

(6) cyclic ethers, such as ethylene oxide, epichlorohydrin and oxetane;

(7) amides, such as N,N-diethylformamide and N,N-dimethylacetamide; amines, such as aniline, morpholine and piperidine; and azo compounds, such as azobenzene;

(8) N-nitroso compounds, such as N-nitrosodimethylamine and N-nitrosodiphenylamine; and (9) compounds containing S—Cl or N—Cl group, such as trichloromelamine, N-chlorosuccinimide and phenylsulfenyl chloride.

The amount of the metathesis catalyst used is desired to be such an amount that a molar ratio between the compound (A) and all the monomers used in the polymerization (compound (A):all the monomers) becomes usually 1:500 to 1:50,000, preferably 1:1,000 to 1:10,000.

The ratio between the compound (A) and the compound (B) (compound (A):compound (B)) is desired to be in the range of 1:1 to 1:50, preferably 1:2 to 1:30, in terms of a metal atom.

The ratio between the compound (C) and the compound (A) (compound (C):compound (A)) is desired to be in the range of 0.005:1 to 15:1, preferably 0.05:1 to 7:1, by mol.

(b) Polymerization Solvent

The solvent for use in the ring-opening polymerization reaction is not specifically restricted provided that it dissolves the monomer composition and the catalyst used in the polymerization, does not deactivate the catalyst and dissolves the resulting ring-opened polymer. Examples of such solvents include alkanes, such as pentane, hexane, heptane, octane, nonane and decane; cycloalkanes, such as cyclohexane, cycloheptane, cyclooctane, decalin and norbornane; aromatic hydrocarbons, such as benzene, toluene, xylene, ethylbenzene and cumene; halogenated alkanes, such as chlorobutane, bromohexane, methylene chloride, dichloroethane, hexamethylene dibromide, chloroform and tetrachloroethylene; halogenated aryl compounds, such as chlorobenzene; saturated carboxylic acid esters, such as ethyl acetate, n-butyl acetate, isobutyl acetate, methyl propionate and dimethoxyethane; and ethers, such as dibutyl ether, tetrahydrofuran and dimethoxyethane. These solvents can be used singly or as a mixture of two or more kinds. Such a solvent can be used not only as a solvent for dissolving the norbornene compound, the copolymerizable monomer and/or the metathesis catalyst but also as a solvent for constituting a molecular weight modifier solution.

The amount of the solvent used is desired to be such an amount that the weight ratio between the solvent and the monomer composition used in the polymerization (solvent: monomer composition) becomes usually 1:1 to 10:1, preferably 1:1 to 5:1.

(c) Molecular Weight Modifier

Although the molecular weight of the resulting ring-opened polymer can be adjusted by the polymerization temperature, the type of the catalyst and the type of the solvent, it is also possible to adjust the molecular weight by allowing a molecular weight modifier to coexist in the reaction system.

Preferred examples of the molecular weight modifiers include α-olefins, such as ethylene, propene, 1-butene, 1-pentene, 1-hexene, 1-heptene, 1-octene, 1-nonene and 1-decene; and aromatic vinyl compounds, such as styrene, 4-methylstyrene, 2-methylstyrene and 4-ethylstyrene. Of these, 1-butene and 1-hexene are particularly preferable. These molecular weight modifiers can be used singly or as a mixture of two or more kinds.

The amount of the molecular weight modifier used is usually 0.005 to 0.6 mol, preferably 0.01 to 0.5 mol, relative to 1 mol of the monomer used in the ring-opening polymerization reaction.

(d) Other Polymerization Conditions

The ring-opened polymer can be obtained by ring-opening polymerizing the norbornene compound alone or ring-opening copolymerizing the norbornene compound and the copolymerizable monomer. Alternatively, the monomer composition containing the norbornene compound may be ring-opening polymerized in the presence of an unsaturated hydrocarbon polymer containing two or more carbon-carbon double bonds in the main chain, such as a conjugated diene compound (e.g., polybutadiene, polyisoprene), a styrene/butadiene copolymer, an ethylene/non-conjugated diene copolymer or polynorbornene.

(B) Addition Polymerization

Production of a polymer by addition (co)polymerization can be carried out by a publicly known addition polymerization reaction of a norbornene compound, and specifically, the monomer composition containing the norbornene compound is addition polymerized using a polymerization catalyst, and if necessary, a polymerization reaction solvent and a molecular weight modifier, whereby a polymer can be produced.

(a) Polymerization Catalyst

The polymerization catalyst used for the addition polymerization is, for example, a single- or multi-component catalyst of palladium, nickel, cobalt, titanium, zirconium or the like, and particular examples thereof include the following catalysts (a-1) to (a-3), without limiting thereto.

(a-1) Single-component Catalyst

As the single-component catalysts, there can be mentioned transition metal compounds, such as:

$[Pd(CH_3CN)_4][BF_4]_2$,
$[Pd(PhCN)_4][SbF_6]$,
$[(\eta^3\text{-crotyl})Pd(\text{cycloocta-1,5-diene})][PF_6]$,
$[(\eta^3\text{-crotyl})Ni(\text{cycloocta-1,5-diene})][B(3,5-(CF_3)_2CF_3)_4]$,
$[(\eta^3\text{-crotyl})Ni(\text{cycloocta-1,5-diene})][PF_6]$,
$[(\eta^3\text{-allyl})Ni(\text{cycloocta-1,5-diene})][B(C_6F_5)_4]$,
$[(\eta^3\text{-crotyl})Ni(\text{cycloocta-1,5-diene})][SbF_6]$,
$Toluene.Ni(C_6F_5)_2$,
$Benzene.Ni(C_6F_5)_2$,
$Mesitylene.Ni(C_6F_5)_2$,
$Ethylether.Ni(C_6F_5)_2$.

(a-2) Multi-component Catalyst (1)

As the multi-component catalyst (a-2), there can be mentioned a combination of a palladium complex having σ-bond or σ- and π-bonds with an organoaluminum or a superacid salt, and examples thereof include:

a combination of di-μ-chloro-bis(6-methoxybicyclo[2.2.1] hept-2-ene-endo-5σ,2π)Pd with a compound selected from methylalumoxane (abbreviated to "MAO"), $AgSbF_6$ and $AgBF_4$;

a combination of $[(\eta^3\text{-aryl})PdCl]_2$ with $AgSbF_6$ or $AgBF_4$; and a combination of $[(\text{cycloocta-1,5-diene})Pd(CH_3)Cl]$, $PPh_3$ and $NaB[3,5-(CF_3)_2C_6H_3]_4$.

(a-3) Multi-component Catalyst (2)

As the multi-component catalyst (a-3), there can be mentioned a combination of three components consisting of (I) a transition metal compound selected from a nickel compound, a cobalt compound, a titanium compound and a zirconium compound, (II) a compound selected from a superacid, a Lewis acid and an ionic boron compound, and (III) an organoaluminum compound.

(I) Transition Metal Compound (I-1) Nickel Compound, Cobalt Compound

The nickel compound or the cobalt compound is, for example, a compound selected from organic carboxylates, organic phosphites, organic phosphates, organic sulfonates and β-diketone compounds of nickel or cobalt. Particular examples thereof include nickel 2-ethylhexanoate, nickel naphthenate, cobalt naphthenate, nickel oleate, nickel dodecanoate, cobalt dodecanoate, cobalt neodecanoate, nickel dibutylphosphite, nickel dibutylphosphate, nickel dioctylphosphate, nickel salt of phosphoric acid dibutyl ester, nickel dodecylbenzenesulfonate, nickel p-toluenesulfonate, bis(acetylacetonato)nickel and bis(ethylacetoacetato)nickel.

Compounds obtained by modifying the above organic carboxylates of nickel with a superacid, such as hexafluoroantimonic acid, tetrafluoroboric acid, trifluoroacetic acid or hexafluoroacetone, are also employable.

Further, diene or triene coordination complexes of nickel, e.g., nickel complexes, such as dichloro(1,5-cyclooctadiene) nickel, [(η$^3$-crotyl) (1,5-cyclooctadiene)nickel]hexafluorophosphate, its tetrafluoroborate complex, tetrakis[3,5-bis(trifluoromethyl)]borate complex, (1,5,9-cyclododecatriene) nickel, bis(norbornadiene)nickel and bis(1,5-cyclooctadiene)nickel, are also employable.

Furthermore, complexes wherein a ligand having an atom such as P, N or O is coordinated to nickel or cobalt, e.g., nickel complexes, such as bis (triphenylphosphine)nickel dichloride, bis (triphenylphosphine)nickel dibromide, bis(triphenylphosphine)cobalt dibromide, bis[tri(2-methylphenyl) phosphine]nickel dichloride, bis[tri(4-methylphenyl) phosphine]nickel dichloride, bis[N-(3-t-butylsalycylidene) phenylaminato]nickel, Ni([PhC(O)CH](Ph), Ni(OC(C$_6$H$_4$) PPh)(H)(PCy$_3$), Ni[OC(O)(C$_6$H$_4$)P](H)(PPh$_3$), a reaction product of bis(1,5-cyclooctadiene)nickel with PhC(O) CH=PPh$_3$, and [2,6-(i-Pr)$_2$C$_6$H$_3$N=CHC$_6$H$_3$ (O) (Anth)] (Ph)(PPh$_3$)Ni ("Anth" is an abbreviation of 9-anthracenyl, "Ph" is an abbreviation of phenyl, and "Cy" is an abbreviation of cyclohexyl), are also employable.

(I-2) Titanium Compound, Zirconium Compound

Examples of the titanium compounds and the zirconium compounds include [t-BuNSiMe(Me$_4$Cp)]TiCl$_2$, (Me$_4$Cp) (O-iPr$_2$C$_6$H$_3$)$_2$TiCl, (Me$_4$Cp)TiCl$_3$, (Me$_4$Cp)Ti(OBu)$_3$, [t-BuNSiMe$_2$Flu]TiMe$_2$, [t-BuNSiMe$_2$Flu]TiCl$_2$, Et(Ind)$_2$ ZrCl$_2$, Ph$_2$C(Ind) (Cp)ZrCl$_2$, iPr(Cp)(Flu)ZrCl$_2$, iPr(3-tert-But-Cp)(Ind)ZrCl$_2$, iPr(Cp) (Ind)ZrCl$_2$, Me$_2$Si(Ind)$_2$ZrCl$_2$, Cp$_2$ZrCl$_2$ ("Cp" is an abbreviation of cyclopentadienyl, "Ind" is an abbreviation of indenyl, and "Flu" is an abbreviation of fluorenyl).

(II) Superacid, Lewis Acid and Ionic Boron Compound

Examples of the superacids include hexafluoroantimonic acid, hexafluorophosphoric acid, hexafluoroarsenic acid, trifluoroacetic acid, fluorosulfuric acid, trifluoromethanesulfonic acid, tetrafluoroboric acid, tetrakis(pentafluorophenyl)boric acid, tetrakis[3,5-bis(trifluoromethyl)phenyl]boric acid, p-toluenesulfonic acid and pentafluoropropionic acid.

Examples of the Lewis acids include boron compounds, such as complexes of boron trifluoride with ether, amine or phenol, complexes of aluminum trifluoride with ether, amine or phenol, tris(pentafluorophenyl)borane and tris[3,5-bis(trifluoromethyl)phenyl]borane; aluminum compounds, such as aluminum trichloride, aluminum tribromide, ethylaluminum dichloride, ethylaluminum sesquichloride, diethylaluminum fluoride and tri(pentafluorophenyl)aluminum; organic halogen compounds showing Lewis acidity, such as hexafluoroacetone, hexachloroacetone, chloranil and hexafluoromethyl ethyl ketone; and compounds showing Lewis acidity, such as titanium tetrachloride and pentafluoroantimony.

Examples of the ionic boron compounds include triphenylcarbenium tetrakis(pentafluorophenyl)borate, triphenylcarbenium tetrakis[3,5-bis(trifluoromethyl)phenyl]borate, triphenylcarbenium tetrakis(2,4,6-trifluorophenyl)borate, triphenylcarbenium tetraphenylborate, tributylammonium tetrakis(pentafluorophenyl)borate, N,N-dimethylanilinium tetrakis(pentafluorophenyl)borate, N,N-diethylanilinium tetrakis(pentafluorophenyl)borate and N,N-diphenylanilinium tetrakis(pentafluorophenyl)borate.

(III) Organoaluminum Compound

Examples of the organoaluminum compounds include alkylalumoxane compounds, such as methylalumoxane, ethylalumoxane and butylalumoxane; alkylaluminum compounds and alkylaluminum halide compounds, such as trimethylaluminum, triethylaluminum, triisobutylaluminum, diisobutylaluminum hydride, diethylaluminum chloride, diethylaluminum fluoride, ethylaluminum sesquichloride and ethylaluminum dichloride; and mixtures of the alkylalumoxane compounds and the alkylaluminum compounds.

The above catalyst components are used in the following amounts.

The transition metal compound is used in an amount of 0.02 to 100 mmol atom relative to 1 mol of the monomer. When an organoaluminum compound is used in combination with the transition metal compound (multi-component systems (1) and (2)), the organoaluminum compound is used in an amount of 1 to 5,000 mol relative to 1 mol of a metal atom of the transition metal compound. When a superacid, Lewis acid or an ionic boron compound is used in combination with the transition metal compound (multi-component system (2)), such a compound is used in an amount of 0.1 to 100 mol relative to 1 mol of a metal atom of the transition metal compound.

(b) Polymerization Solvent

The solvent for use in the addition polymerization reaction is not specifically restricted provided that it dissolves the monomer composition and the catalyst used in the polymerization, does not deactivate the catalyst and dissolves the resulting addition polymer. Examples of such solvents include alicyclic hydrocarbon solvents, such as cyclohexane, cyclopentane and methylcyclopentane; aliphatic hydrocarbon solvents, such as hexane, heptane and octane; aromatic hydrocarbon solvents, such as toluene, benzene, xylene and mesitylene; and halogenated hydrocarbon solvents, such as dichloromethane, 1,2-dichloroethane, 1,1-dichloroethane, tetrachloroethane, chlorobenzene and dichlorobenzene. These solvents can be used singly or as a mixture of two or more kinds.

(c) Molecular Weight Modifier

In the present invention, adjustment of a molecular weight of the resulting norbornene addition polymer can be carried out by adding hydrogen or an α-olefin as a molecular weight modifier into the polymerization system. As the amount of the molecular weight modifier added is increased, the molecular weight of the resulting norbornene addition polymer is lowered.

(Hydrogenation Reaction)

The polymer obtained by the ring-opening polymerization reaction has an olefinic unsaturated bond in its molecule. Also in case of the addition polymerization reaction, the resulting polymer sometimes has an olefinic unsaturated bond in its molecule. If the olefinic unsaturated bond is present in the polymer molecule, it sometimes causes deterioration such as coloring with time or gelation, and therefore, it is preferable to carry out hydrogenation reaction to convert the olefinic unsaturated bond into a saturated bond.

The hydrogenation reaction can be carried out by a usual method, that is, by adding a publicly known hydrogenation catalyst to a solution of the polymer having an olefinic unsaturated bond and allowing a hydrogen gas to act thereon at normal pressure to 300 atm, preferably 3 to 200 atm, and 0 to 200° C., preferably 20 to 180° C.

The hydrogenation ratio of the hydrogenated polymer is usually not less than 50%, preferably not less than 70%, more preferably not less than 90%, particularly preferably not less than 98%, most preferably not less than 99%, as a value measured by $^1$H-NMR at 500 MHz. As the hydrogenation ratio is increased, the hydrogenated polymer has higher stability to heat or light, and when the polymer is used to form a molded article, the molded article can exhibit stable properties for a long period of time, so that the hydrogenation ratio is preferably as high as possible.

In the case where the polymer obtained by the above process has an aromatic group in its molecule, this aromatic group does not cause deterioration such as coloring with time or gelation, or rather, it sometimes exerts an advantageous effect on the mechanical properties or the optical properties. Therefore, such an aromatic group does not necessarily have to be hydrogenated.

As the hydrogenation catalyst, a catalyst used for usual hydrogenation reaction of olefinic compounds is employable. The hydrogenation catalyst is, for example, a heterogeneous catalyst or a homogeneous catalyst.

Examples of the heterogeneous catalysts include solid catalysts wherein a precious metal catalyst substance, such as palladium, platinum, nickel, rhodium or ruthenium, is supported on a carrier, such as carbon, silica, alumina or titania. Examples of the homogeneous catalysts include nickel naphthenate/triethylaluminum, nickel acetylacetonate/triethylaluminum, cobalt octenate/n-butyllithium, titanocene dichloride/diethylaluminum monochloride, rhodium acetate, chlorotris(triphenylphosphine)rhodium, dichlorotris(triphenylphosphine)ruthenium, chlorohydrocarbonyltris(triphenylphosphine)ruthenium and dichlorocarbonyltris(triphenylphosphine) ruthenium. The form of these catalysts may be each powder or particles.

The hydrogenation catalyst is usually used in such an amount that the weight ratio between the ring-opened polymer and the hydrogenation catalyst (ring-opened polymer: hydrogenation catalyst) becomes $1:1\times10^{-6}$ to 1:2.

(Properties of Norbornene Resin)

The norbornene resin for use in the invention has an intrinsic viscosity $[\eta]_{inh}$, as measured in chloroform at 30° C., of preferably 0.2 to 2.0 dl/g, more preferably 0.35 to 1.0 dl/g, particularly preferably 0.4 to 0.85 dl/g, a number-average molecular weight (Mn) of preferably 5,000 to 1,000,000, more preferably 10,000 to 500,000, particularly preferably 15,000 to 250,000, and a weight-average molecular weight (Mw) of 10,000 to 2,000,000, more preferably 20,000 to 1,000,000, particularly preferably 30,000 to 500,000, wherein Mn and Mw are in terms of polystyrene and are measured by gel permeation chromatography (GPC). When the intrinsic viscosity $[\eta]_{inh}$, the number-average molecular weight and the weight-average molecular weight are in the above ranges, the norbornene resin has excellent mechanical strength, and a norbornene resin substrate (film) that is hardly broken is obtained.

The norbornene resin has a glass transition temperature (Tg) of usually not lower than 120° C., preferably not lower than 130° C., more preferably not lower than 150° C. When Tg is in this range, adhesion strength of a dielectric multi-layer film to a substrate is increased, and a norbornene resin substrate (film) having excellent resistance to solder reflowing can be obtained.

The norbornene resin has a saturated water absorption of usually not more than 1% by weight, preferably 0.1 to 0.8% by weight. If the saturated water absorption is more than 1% by weight, a resin substrate (film) obtained from the resin sometimes has a problem on durability, such as distortion by water (moisture) absorption with time depending on the use environment. If the saturated water absorption is less than 0.1% by weight, the resin substrate (film) has sometimes a problem on adhesion properties. When the saturated water absorption is in the above range, further, deterioration of an image pickup device due to moisture content can be inhibited especially in the case where the resin is used for a translucent cap of a package for encasing a solid-state image pickup device. The saturated water absorption is a value obtained by measuring an increase in weight after immersion for one week in water at 23° C. in accordance with ASTM D570.

(Other Components)

In the present invention, additives such as an antioxidant and an ultraviolet light absorber may be further added to the norbornene resin within limits not detrimental to the effects of the present invention.

Examples of the antioxidants include 2,6-di-t-butyl-4-methylphenol, 2,2'-dioxy-3,3'-di-t-butyl-5,5'-dimethyldiphenylmethane and tetrakis[methylene-3-(3,5-di-t-butyl-4-hydroxyphenyl)propionato]methane.

Examples of the ultraviolet light absorbers include 2,4-dihydroxybenzophenone and 2-hydroxy-4-methoxybenzophenone. In the case where a norbornene resin substrate (film) is produced by the later-described solution casting, the resin substrate (resin film) can be readily formed by the addition of a leveling agent or an anti-foaming agent.

These additives may be mixed with the norbornene resin when a norbornene resin substrate (film) for use in the invention is produced, or may be previously added when the norbornene resin is prepared. Although the amounts of the additives are properly selected according to the desired properties of the substrate (film), they are in the range of usually 0.01 to 5.0 parts by weight, preferably 0.05 to 2.0 parts by weight, relative to 100 parts by weight of the norbornene resin.

(Process for Producing Norbornene Resin Film)

The norbornene resin film for use in the invention can be preferably formed by directly subjecting the norbornene resin to melt molding or by dissolving the resin in a solvent and then subjecting the solution to casing (cast molding).

(A) Melt Molding

The norbornene resin film for use in the invention can be produced by melt molding the norbornene resin or a resin composition containing the norbornene resin and the aforesaid additives. The melt molding method is, for example, injection molding, melt extrusion or blow molding.

(B) Casting

The norbornene resin film for use in the invention can be produced also by casting a liquid resin composition, in which the norbornene resin and if necessary the aforesaid additives are dissolved in a solvent, onto an appropriate base material and then removing the solvent. For example, the liquid resin composition is applied onto a base material, such as a steel belt, a steel drum or a polyester film, and dried to remove the solvent, and then the coating film is separated from the base material, whereby a norbornene resin film can be obtained.

The amount of the residual solvent in the norbornene resin film obtained by the above process is as small as possible, and is usually not more than 3% by weight, preferably not more than 1% by weight, more preferably not more than 0.5% by weight. If the amount of the residual solvent is more than 3% by weight, the film is sometimes distorted with time or properties of the film is sometimes changed, and a norbornene resin film cannot sometimes exerted desired functions.

Although the thickness of the norbornene resin film for use in the invention is not specifically restricted, it is desired to be in the range of usually 5 to 500 μm, preferably 10 to 150 μm, more preferably 20 to 100 μm. If the thickness of the film is too small, the film sometimes has insufficient strength. If the film is too thick, it sometimes has high form birefringence, low transparency and poor appearance.

The norbornene resin film for use in the invention desirably has a light transmittance of usually not less than 80%, preferably not leas than 85%, more preferably not less than 90%.

For the purpose of enhancing adhesion to the later-described polyurethane layer, the norbornene resin film for use in the invention may be subjected to surface treatment. Examples of the surface treatments include primer treatment, plasma treatment, corona treatment, alkali treatment and coating treatment.

Especially by the use of the corona treatment among the above surface treatments, the norbornene resin film can be firmly bonded to the polyurethane layer. As the corona treatment conditions, an irradiation dose of corona discharge electron is in the range of preferably 1 to 1000 $W/m^2/min$, more preferably 10 to 100 $W/m^2/min$. If the irradiation dose is lower than the above dose, satisfactory surface modification effect cannot be sometimes obtained. If irradiation dose is higher than the above dose, the effect of the treatment sometimes extend to the interior portion of the norbornene resin film, so that the norbornene resin film itself is likely to change in quality. This corona treatment may be subjected not only to a surface to form the polyurethane layer but also to the opposite side surface.

(Process for Producing Retardation Film)

The norbornene resin film for use in the invention can be used as a retardation film by subjecting the resin film to stretching.

As the stretching of the resin film, uniaxial stretching or biaxial orientation of the film is employable.

In case of the uniaxial stretching, the stretching rate is in the range of usually 1 to 5,000%/min, preferably 50 to 1,000%/min, more preferably 100 to 1,000%/min.

In case of the biaxial orientation, a method of performing stretching in two directions at the same time, or a method comprising performing uniaxial stretching in one direction and then performing stretching in a different direction from the above direction is applicable. In either case, the crossing angle formed by the two stretching axes is properly determined according to the properties required for the desired optical film (retardation film) and is not specifically restricted, but usually, it is in the range of 60 to 120°. The stretching rates in the two stretching directions may be the same as or different from each other and each is in the range of usually 1 to 5,000%/min, preferably 50 to 1,000%/min, more preferably 100 to 1,000%/min, particularly preferably 100 to 500%/min.

Although the stretching temperature is not specifically restricted, it is usually Tg±30° C., preferably Tg±15° C., more preferably Tg−5 to Tg+15° C., based on the glass transition temperature (Tg) of the norbornene resin used. By setting the stretching temperature in this range, occurrence of nonuniform ability of imparting retardation in the resulting stretched film can be inhibited, and control of an index ellipsoid can be facilitated, so that the above temperature is preferable.

The stretch ratio is properly determined according to the properties required for the desired optical film and is not specifically restricted, but it is in the range of usually 1.01 to 10 times, preferably 1.03 to 5 times, more preferably 1.03 to 3 times. If the stretch ratio is over this range, it is sometimes difficult to adjust ability of imparting retardation of the resulting stretched film. Although the stretched film may be cooled as such, it is preferable to cool it after it is held in a temperature atmosphere of Tg−20° C. to Tg for a period of not shorter than 10 seconds, preferably 30 seconds to 60 minutes, more preferably 1 minute to 60 minutes, whereby a stable retardation film suffering less change in retardation of transmitted light with time can be obtained.

In the film having been subjected to the stretching as above, molecules are orientated by the stretching, and as a result, the film can impart retardation to the transmitted light. This ability of imparting retardation can be adjusted by the stretch ratio, stretching temperature, thickness of the film and the like.

Although the thickness of the norbornene resin film used as a retardation film is not specifically restricted, it is desired to be in the range of usually 5 to 500 μm, preferably 10 to 150 μm, more preferably 20 to 100 μm.

Also the retardation film may be subjected to the aforesaid surface treatment.

Polyurethane Layer

The polyurethane layer can be formed by applying the polyurethane composition onto a surface of the norbornene resin film and drying the composition. The polyurethane composition preferably contains a polyurethane resin and a solvent.

(Polyurethane Resin)

The polyurethane resin is not specifically restricted provided that it is a resin having plural urethane bonds. Examples of the polyurethane resins include a polymer obtained by reacting a polyol compound with a polyisocyanate.

In order to stably dissolve or disperse the polyurethane resin for use in the invention in an organic solvent and/or water and in order to improve coating properties of the resulting adhesive and adhesion properties to a base material and an adhesive layer, it is preferable to add a hydrophilic group-containing compound to the polyol compound and the polyisocyanate.

(Polyol Compound)

The polyol compound is, for example, polyether polyol, polyester polyol or polyacrylic polyol. Of these, polyether polyol is preferable from the viewpoint that the resulting adhesive exhibits satisfactory adhesion properties.

Examples of the polyether polyols include poly(alkylene glycols), such as polyethylene glycol, polypropylene glycol, polytetramethylene glycol, polyhexamethylene glycol, polyheptamethylene glycol and polydecamethylene glycol; polyether polyols obtained by ring-opening copolymerizing two or more ionically polymerizable cyclic compounds; polyether polyols obtained by ring-opening copolymerizing an ionically polymerizable cyclic compound with a cyclic imine such as ethylene imine, a cyclic lactonic acid such as β-propiolactone or glycolic lactide, or dimethylcyclopolysiloxane; and polyether polyols obtained by ring-opening addition polymerizing one or more ionically polymerizable cyclic compounds onto a polyhydric alcohol. These ionically polymerizable cyclic compounds may be ring-opening (co)polymerized in random order or in block form.

Examples of the polyhydric alcohols include ethylene glycol, propylene glycol, glycerol, trimethylolpropane, pentaerythritol, bisphenol A, bisphenol F, hydrogenated bisphenol A, hydrogenated bisphenol F, hydroquinone, naphthohydroquinone, anthrahydroquinone, 1,4-cyclohexanediol, tricyclodecanediol, tricyclodecanedimethanol, pentacyclopentadecanediol and pentacyclopentadecanedimethanol. These polyhydric alcohols can be used singly or in combination of two or more kinds.

Examples of the ionically polymerizable cyclic compounds include cyclic ethers, such as ethylene oxide, propylene oxide, 1,2-butylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcyclohexene oxide, phenyl glycidyl ether, butyl glycidyl ether and glycidyl benzoate. These compounds can be used singly or in combination of two or more kinds.

Of the above polyether polyols, polytetramethylene glycol and polyhexamethylene glycol are preferable, and polytetramethylene glycol is particularly preferable.

(Polyisocyanate)

As the polyisocyanate, polyisocyanate used for the production of a usual polyurethane can be used without any restriction. Examples of the polyisocyanates include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl isocyanate), 2,2,4-trimethylhexamethylene diisocyanate, bis(2-isocyanatoethyl)fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate and 2,5 (or 6)-bis(isocyanatomethyl)-bicyclo[2.2.1]heptane. These polyisocyanates can be used singly or in combination of two or more kinds. Of the polyisocyanates, isophorone diisocyanate and methylenebis(4-cyclohexyl isocyanate) are particularly preferable.

(Hydrophilic Group-Containing Compound)

The hydrophilic group-containing compound is, for example, an ionic compound having at least one active hydrogen atom in the molecule and containing at least one functional group selected from the group consisting of a carboxylic acid group and a sulfonic acid group.

Examples of such hydrophilic group-containing compounds include sulfonic acid compounds, such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid and 2,4-diaminotoluene-5-sulfonic acid, derivatives of these sulfonic acid compounds; carboxylic acid-containing compounds, such as (meth)acrylic acid, poly(meth)acrylic acid, 2,2-dimethylolpropionic acid, 2,2-dimethylolbutyric acid, 2,2-dimethylolvaleric acid, dioxymaleic acid, 2,6-dioxybenzoic acid and 3,4-diaminobenzoic acid, and derivatives of these carboxylic acid-containing compounds.

It is preferred to react the polyol compound, the polyisocyanate and if necessary the hydrophilic group-containing compound usually in the presence of a urethanation catalyst. The preparation process is not specifically restricted, and a publicly known process can be applied.

Examples of the urethanation catalysts include copper naphthenate, cobalt naphthenate, zinc naphthenate, di-n-butyltin laurate, triethylamine, 1,4-diazabicyclo[2.2.2]octane, 2,6,7-trimethyl-1,4-diazabicyclo[2.2.2]octane, anhydrous hydrazine and hydrated hydrazine. The urethanation catalyst is preferably used in an amount of 0.01 to 1 part by weight relative to 100 parts by weight of the total amount of the reactants. The reaction temperature is in the range of usually 10 to 90° C., particularly preferably 30 to 80° C.

The polyurethane resin for use in the invention has a weight-average molecular weight in terms of polystyrene, as measured by gel permeation chromatography, of usually 1,000 to 200,000, preferably 30,000 to 100,000.

(Solvent)

The solvent used for the polyurethane composition is not specifically restricted provided that it can dissolve or disperse the polyurethane resin. Examples of the solvents include an organic solvent or water.

Examples of the organic solvents include methanol, ethanol, isopropyl alcohol, n-butyl alcohol, acetone, toluene, methyl ethyl ketone, methyl isobutyl ketone and ethyl acetate.

When water is used as the solvent, the polyurethane composition may be in any form of an emulsion, a colloidal dispersion and an aqueous solution. Water can be used in combination with the above alcohols or ketones. Further, a dispersant may be used, or a functional group, such as carboxyl group, sulfonyl group or ammonium group, may be introduced into the polyurethane resin.

Of the above-solvents, methanol, ethanol, isopropyl alcohol, n-butyl alcohol, methyl ethyl ketone, methyl isobutyl ketone and water are preferable from the viewpoints that change in ability of imparting retardation of the substrate is small and excellent coating properties are obtained. The above solvents can be used singly or in combination of two or more kinds.

The polyurethane composition for use in the invention has a solids concentration of usually 1 to 60% by weight, preferably 1 to 30% by weight, more preferably 1 to 10% by weight. If the solids concentration is lower than 1% by weight, it is difficult to form a polyurethane layer having a desired thickness. If the solids concentration is higher than 60% by weight, it is difficult to obtain a uniform polyurethane layer.

(Other Components)

To the polyurethane composition for use in the invention, a crosslinking agent, a tackifier, an antioxidant, a colorant, an ultraviolet light absorber, a light stabilizer, a silane coupling agent, a thermal polymerization inhibitor, a leveling agent, a surface active agent, a storage stabilizer, a plasticizer, a lubricant, a filler, an anti-aging agent, a wetting property improver, a coating surface improver and the like can be further added.

Especially when a carboxyl group is introduced into the polyurethane resin by the use of the hydrophilic group-containing compound, it is preferable to use an epoxy curing agent.

The epoxy curing agent for use in the invention is not specifically restricted provided that it has at least one epoxy group in the molecule. Examples of such epoxy curing agents include bisphenol-based epoxy compounds, novolak-based epoxy compounds, alicyclic epoxy compounds, aliphatic epoxy compounds, aromatic epoxy compounds, glycidylamine-based epoxy compounds and halogenated epoxy compounds.

More specifically, there can be mentioned:

bisphenol-based epoxy compounds, such as bisphenol A diglycidyl ether, bisphenol F diglycidyl ether and bisphenol S diglycidyl ether;

novolak-based epoxy compounds, such as phenolic novolak epoxy compound and cresol novolak epoxy compound;

alicyclic epoxy compounds, such as 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylenebis (3,4-epoxycyclohexane), dicyclopentadiene diepoxide, di(3,4-epoxycyclohexylmethyl) ether of ethylene glycol, ethylenebis(3,4-epoxycyclohexane carboxylate), epoxidized tetrabenzyl alcohol, lactone-modified 3,4-epoxycyclohexylmethyl-3',4'-epoxycyclohexane carboxylate, lactone-modified epoxidized tetrahydrobenzyl alcohol, cyclohexene oxide, hydrogenated bisphenol A diglycidyl ether, hydrogenated bisphenol F diglycidyl ether and hydrogenated bisphenol AD diglycidyl ether;

aliphatic epoxy compounds, such as 1,4-butanediol diglycidyl ether, 1,6-hexanediol diglycidyl ether, polyethylene glycol diglycidyl ether, glycerol triglycidyl ether and trimethylolpropane triglycidyl ether;

halogenated epoxy compounds, such as brominated bisphenol A diglycidyl ether, brominated bisphenol F diglycidyl ether and brominated bisphenol S diglycidyl ether; and glycidylamine-based epoxy compounds, such as tetraglycidylaminophenylmethane.

In addition to the above-mentioned epoxy compounds, examples of the epoxy curing agents further include polyalkylene glycol polyglycidyl ethers, such as polyethylene glycol diglycidyl ether and polypropylene glycol diglycidyl ether; polyglycidyl ethers of polyether polyols obtained by addition of one or more alkylene oxides to aliphatic polyhydric alcohols such as ethylene glycol, propylene glycol and glycerol; diglycidyl esters of aliphatic long-chain dibasic acids; monoglycidyl ethers of higher fatty alcohols; monoglycidyl ethers of phenol, cresol, butylphenol or polyether alcohols obtained by the addition of alkylene oxide to phenol, cresol or butylphenol; glycidyl esters of higher fatty acids; and epoxidized soybean oil, butyl epoxystearate, octyl epoxystearate and epoxidized linseed oil.

An epoxy resin obtained by previously polymerizing one or more of the above epoxy compounds in preferred amounts is also employable.

Further, examples of the epoxy compounds for use in the invention include polymers obtained by epoxidizing a polymer of a conjugated diene monomer, a copolymer of a conjugated diene monomer and a compound having an ethylenically unsaturated bond group, a copolymer of a diene monomer and a compound having an ethylenically unsaturated bond group, and a (co)polymer such as natural rubber.

Of the above compounds, polyethylene glycol diglycidyl ether is preferable.

In order to prevent blocking of films having the polyurethane layer which occurs when the films are superposed upon each other and in order to reduce electrostatic charge which occurs when the films are separated, the polyurethane layer may comprise a filler. By the addition of the filler, surface properties of the polyurethane layer can be adjusted. The type of the filler used for this purpose is not specifically restricted, but if there is a large difference between a refractive index of the polyurethane layer and that of the filler, scattering of light takes place, and therefore, the refractive index of the filler is preferably as close as possible to that of the polyurethane layer. Specifically, a filler having a refractive index of about 1.5, e.g., silica particles or acrylic particles, can be preferably employed. In order to adjust the surface properties of the polyurethane layer, the particle diameter of the filler should be selected according to the dry film thickness of the polyurethane layer, but the particle diameter is in the range of usually 0.05 to 2 times, preferably 0.1 to 1 time, the dry film thickness of the polyurethane layer. Although the amount of the filler to be added to the polyurethane layer is not specifically restricted, it is preferably in the range of 0.1 to 20% by weight based on the whole amount of the polyurethane composition.

Examples of commercial products of the polyurethane resins in the invention include HYDRAN WLS-201, WLS-202, WLS-210, WLS-213 and WLS-220 (available from DAINIPPON INK AND CHEMICALS, INC.).

(Formation of Polyurethane Layer)

The polyurethane layer can be formed by applying the polyurethane composition onto a surface of the norbornene resin film and drying the composition. The polyurethane layer may be formed on one surface or both surfaces of the norbornene resin film.

The method for applying the polyurethane composition is not specifically restricted, and various methods, such as spin coating, wire coating, bar coating, roll coating, blade coating, curtain coating and screen printing, are employable.

The drying temperature after coating is not specifically restricted, but a temperature of 60 to 150° C. is preferable. The amount of the residual solvent in the polyurethane layer is preferably as small as possible, and it is usually not more than 3% by weight, preferably not more than 1% by weight, more preferably not more than 0.5% by weight.

The thickness of the polyurethane layer formed is not specifically restricted, but it is in the range of usually 0.01 to 5 µm, preferably 0.05 to 4 µm, more preferably about 0.1 to 3 µm. If the thickness of the polyurethane layer is too thin, desired adhesion properties cannot be sometimes achieved. If the thickness of the polyurethane layer is too thick, the polyurethane layer sometimes dissolves and becomes clouded when the adhesive is applied thereon.

The polyurethane layer desirably has a total light transmittance of usually not less than 80%, preferably not less than 90%.

The norbornene resin film having the polyurethane layer can be favorably used not only for a polarizing plate but also as a transparent substrate, such as a film with a hard coating, a film with an antireflection film, a film with a transparent conductive film or an infrared/ultraviolet protection film because of its excellent adhesion properties.

Adhesive Layer

The adhesive layer to constitute the polarizing plate of the invention can be formed by applying an adhesive other than the polyurethane and drying the adhesive. Examples of the adhesives include aqueous adhesives, solvent based adhesives, two-component curing adhesives, ultraviolet curing adhesives, pressure-sensitive adhesives. Of these adhesives, the aqueous adhesives are preferable, and a polyvinyl alcohol based aqueous adhesive is particularly preferable.

Examples of the polyvinyl alcohol based aqueous adhesives include aqueous dispersions obtained by dissolving or dispersing in water a polyvinyl alcohol resin, such as a polyvinyl alcohol (e.g., partially saponified polyvinyl alcohol and completely saponified polyvinyl alcohol) or a modified polyvinyl alcohol (e.g., carboxyl group modified polyvinyl alcohol and acetoacetyl group modified polyvinyl alcohol. The average degree of polymerization of the polyvinyl alcohol resin is preferably in the range of 500 to 2,000 from the viewpoint that an aqueous adhesive having a preferred viscosity is obtained. In order to crosslink the polyvinyl alcohol resin, the aqueous adhesive may contain a component having a functional group capable of reacting with a hydroxyl group, such as an isocyanate group. Further, when the polyvinyl alcohol resin is dissolved in water, it is also preferable to add a small amount of a solvent having excellent solubility in water, such as alcohol or ketone, in order to improve wetting properties to the substance to be coated.

The solvent based adhesive is, for example, an adhesive obtained by dissolving a synthetic rubber, a synthetic resin or the like in an organic solvent.

The two-component curing adhesive is, for example, a two-component curing epoxy adhesive.

The ultraviolet curing adhesive is, for example, an ultraviolet curing acrylic adhesive.

Examples of the pressure-sensitive adhesives include pressure-sensitive adhesives comprising natural rubber, synthetic rubber/elastomer, vinyl chloride/vinyl acetate copolymer, polyvinyl alkyl ether, polyacrylate, modified polyolefin resin or the like; and pressure-sensitive curing adhesives obtained by adding a curing agent such as isocyanate to these adhesives. Of these, pressure-sensitive adhesives used for adhesion of polyolefin films or polyester films are preferable.

In addition to the above adhesives, any adhesives used for adhesion of polyolefin films, such as polyethylene film and polypropylene film, are also employable. Further, styrene/butadiene rubber adhesive, a two-component adhesive comprising epoxy resin and polythiol, and a two-component adhesive comprising epoxy resin and polyamide are employable. Of these adhesives, transparent adhesives are preferable.

Although the thickness of the adhesive layer formed is not specifically restricted, it is preferably not more than 50 μm. The adhesive layer in the invention has a light transmittance of preferably not less than 80%, particularly preferably not less than 90%.

Polarizing Film

The polarizing film for use in the invention is not specifically restricted and any polarizing film can be employed, provided that it has a function of a polarizing film, that is, it divides incident light into two light components polarized at right angles to each other, allows one of them to pass through and absorbs or scatters the other component.

Examples of the polarizing films employable in the invention include a polyvinyl alcohol (abbreviated to "PVA" hereinafter)/iodine polarizing film; a PVA/dye polarizing film obtained by adsorbing and orientating a dichroic dye on a PVA film; a polyene polarizing film obtained by forming polyene by dehydration reaction of a PVA film or dehydrochlorination reaction of a polyvinyl chloride film; and a polarizing film having a dichroic dye on a surface and/or inside of a PVA film comprising modified PVA containing a cationic group in the molecule. Of these, the PVA/iodine polarizing film is preferable.

The process for producing a polarizing film for use in the invention is not specifically restricted. For example, publicly known processes, such as a process wherein a PVA film is stretched and then iodine ion is adsorbed on the film, a process wherein a PVA film is colored with a dichroic dye and then the film is stretched, a process wherein a PVA film is stretched and then the film is colored with a dichroic dye, a process wherein a dichroic dye is printed on a PVA film and then the film is stretched, and a process wherein a PVA film is stretched and then a dichroic dye is printed on the film, can be exemplified. More specifically, there can be mentioned a process wherein iodine is dissolved in a potassium iodide solution to prepare higher iodine ion, this ion is adsorbed on a PVA film, then the film is stretched and immersed in a boric acid aqueous solution of 1 to 4% by weight at a bath temperature of 30 to 40° C. to produce a polarizing film, or a process wherein a PVA film is treated with boric acid in the same manner as above and uniaxially stretched in a stretch ratio of 3 to 7 times, then the film is immersed in a dichroic dye aqueous solution of 0.05 to 5% by weight at a bath temperature of 30 to 40° C. to adsorb the dye on the film, and the film is dried at 80 to 100° C. to thermally fix the dye and thereby produce a polarizing film.

Although the thickness of the polarizing film for use in the invention is not specifically restricted, it is desired to be in the range of 10 to 50 μm, preferably 15 to 45 μm.

The polarizing film may be used as it is for the production of a polarizing plate of the invention, but it can be used after the film surface to be brought into contact with an adhesive layer is subjected to corona discharge treatment or plasma treatment.

Production Process of Polarizing Plate

The polarizing plate of the invention comprises the norbornene resin film, the polyurethane layer, the adhesive layer and the polarizing film which are laminated in this order.

The polarizing plate can be preferably produced by previously forming the polyurethane layer on a surface of the norbornene resin film by applying the polyurethane composition thereon and then bonding the polarizing film to a surface of the polyurethane layer through the adhesive. The adhesive layer may be formed on the polyurethane layer or may be formed on a surface of the polarizing film.

A process to bond the polarizing film to the norbornene resin film having the polyurethane layer can be properly selected according to the types of the polarizing film, the polyurethane resin and the adhesive. For example, a process comprising forming the adhesive layer on the polyurethane layer, laminating the adhesive layer and the polarizing film and pressure bonding them; and a process comprising forming the adhesive layer on a surface of the polarizing film, laminating the adhesive layer and the norbornene resin film having the polyurethane layer and pressure bonding them can be mentioned. The pressure bonding is preferably carried in an atmosphere of 18 to 25° C. at a pressure of 1 kg/cm$^2$.

The polarizing plate of the invention has an excellent polarizing function, exhibits strong adhesion between the norbornene resin film and the polarizing film, is excellent also in properties such as heat resistance and chemical resistance, rarely suffers delamination, distortion and change in ability of imparting retardation even if it is used for a long period of time, and has high reliability and excellent durability. Such a polarizing plate can be favorably used for a liquid crystal display device and the like.

Effect of the Invention

According to the present invention, a polarizing plate, which has an excellent polarizing function, exhibits excellent adhesion between the optical film and the polarizing film, is excellent also in properties such as heat resistance and chemical resistance, rarely suffers delamination and distortion even if it is used for a long period of time, and has high reliability, can be provided, and a process for producing the polarizing plate can be provided.

EXAMPLES

The present invention is further described with reference to the following examples, but it should be construed that the invention is in no way limited to those examples. In the examples, the term "part(s)" means "part(s) by weight", unless otherwise noted.

Measurements of glass transition temperature, total light transmittance, degree of polarization, retardation of transmitted light and adhesion, a wet heat test and a dry heat test were carried out by the following methods.

<Glass Transition Temperature (Tg)>

The glass transition temperature (also referred to as "Tg" hereinafter) was measured using a differential scanning calorimeter (DSC) manufactured by Seiko Instruments Inc. under the conditions of a nitrogen atmosphere and a heating rate of 20° C./min.

<Total Light Transmittance>

The total light transmittance was measured using a haze meter (model HGM-2DP) manufactured by SUGA TEST INSTRUMENTS Co., Ltd.

<Degree of Polarization>

The degree of polarization at a wavelength of 547.7 nm was measured using "KOBRA-21ADH/PR" manufactured by Oji Scientific Instruments.

<Retardation of Transmitted Light>

The retardation values at wavelengths of 480 nm, 550 nm, 590 nm, 630 nm and 750 nm were measured using "KOBRA-21ADH" manufactured by Oji Scientific Instruments, and the retardation values at other wavelengths were calculated from the Cauchy's dispersion formula based on the retardation values at the above wavelengths.

<Adhesion Properties (Adhesion Between Polarizer and Protective Film)>

Peeling between a polarizer and a film of a polarizing plate was attempted manually, and the degrees of occurrences of delamination and material failure was visually observed and evaluated based on the following criteria.

A: Delamination does not occur, and material failure only occurs.

B: Material failure partially occurs, and delamination partially occurs simultaneously.

C: Delamination only occurs, and material failure does not occur.

<Wet Heat Test>

After a polarizing plate was stored for 500 hours in the environment of a temperature of 40° C. and a relative humidity of 95%, evaluation of various items was carried out.

<Dry Heat Test>

After a polarizing plate was stored for 500 hours in the environment of a temperature of 80° C., evaluation of various items was carried out.

Synthesis Example 1

(Synthesis of Norbornene Resin)

In a reaction vessel purged with nitrogen, 225 parts of 8-methyl-8-carboxymethyltetracyclo[4.4.0.1$^{2,5}$.1$^{7,10}$]dodec-3-ene, 25 parts of bicyclo[2.2.1]hept-2-ene, 18 parts of 1-hexene as a molecular weight modifier and 750 parts of toluene as a solvent were placed, and this solution was heated to 60° C. Then, to the solution in the reaction vessel, 0.62 part of a toluene solution containing triethylaluminum (concentration: 1.5 ml/L) and 3.7 parts of a toluene solution containing tungsten hexachloride modified with t-butanol and methanol (t-butanol:methanol:tungsten=0.35 mol:0.3 mol:1 mol) (concentration: 0.05 mol/L) were added as polymerization catalysts. The resulting solution was stirred with heating at 80° C. for 3 hours to perform ring-opening copolymerization reaction, whereby a solution containing a ring-opened copolymer was obtained.

The polymerization conversion in this copolymerization reaction was 97%. An intrinsic viscosity ($\eta_{inh}$) of the resulting ring-opened copolymer in chloroform at 30° C. was measured, and as a result, it was 0.65 dl/g.

In an autoclave, 4000 parts of the resulting ring-opened copolymer solution were placed. To the ring-opened copolymer solution, 0.48 part of carbonylchlorohydridotris[triphenylphosphine]ruthenium (RuHCl(CO)[P(C$_6$H$_5$)$_3$]$_3$) was added, and they were stirred with heating for 3 hours under the conditions of a hydrogen gas pressure of 100 kg/cm$^2$ and a reaction temperature of 165° C. to perform hydrogenation reaction.

After the resulting solution containing a hydrogenated polymer was cooled, the hydrogen gas pressure was released. The solution was poured into a large amount of methanol to separate and collect a solidified substance, and the solidified substance was dried to give a hydrogenated polymer (also referred to as a "resin (a-1)" hereinafter).

A hydrogenation ratio of the resulting resin (a-1) was measured by a $^1$H-NMR spectrum under the condition of 400 MHz, and as a result, it was 99.9%.

Further, a number-average molecular weight (Mn) and a weight-average molecular weight (Mw) in terms of polystyrene of the resin (a-1) were measured by gel permeation chromatography (GPC, column: four columns in series consisting of TSKgel G7000H$_{XL}$×1, TSKgel GMH$_{XL}$×2 and TSKgel G2000H$_{XL}$×1, available from TOSOH CORPORATION, solvent: tetrahydrofuran). As a result, the number-average molecular weight (Mn) was 39,000, the weight-average molecular weight (Mw) was 116,000, and the molecular weight distribution (Mw/Mn) was 2.97.

The resin (a-1) had a glass transition temperature (Tg) of 130° C. and a saturated water absorption at 23° C. of 0.3% by weight. Furthermore, measurement of a SP value of the resin (a-1) resulted in 19 MPa$^{1/2}$, and measurement of an intrinsic viscosity ($\eta_{inh}$) of the resin (a-1) in chloroform at 30° C. resulted in 0.67 dl/g.

Synthesis Example 2

(Synthesis of Norbornene Resin)

A hydrogenated polymer (also referred to as a "resin (b-1)" hereinafter) was obtained in the same manner as in Synthesis Example 1, except that 200 parts of 8-methyl-8-methoxycarbonyltetracyclo[4.4.0.1$^{2,5}$.1$^{7,10}$]dodec-3-ene and 50 parts of 5-(4-biphenylcarbonyloxymethyl) bicyclo[2.2.1]hept-2-ene were used as monomers.

A hydrogenation ratio of the resulting resin (b-1) was measured by a $^1$H-NMR spectrum under the condition of 400 MHz, and as a result, it was 99.9%. Further, it was observed that the aromatic ring had not been substantially hydrogenated.

Furthermore, a number-average molecular weight (Mn) and a weight-average molecular weight (Mw) in terms of polystyrene of the resin (b-1) were measured by gel permeation chromatography (GPC, column: four columns in series consisting of TSKgel G7000H$_{XL}$×1, TSKgel GMH$_{XL}$×2 and TSKgel G2000H$_{XL}$×1, available from TOSOH CORPORATION, solvent: tetrahydrofuran). As a result, the number-average molecular weight (Mn) was 47,000, the weight-average molecular weight (Mw) was 187,000, and the molecular weight distribution (Mw/Mn) was 3.98.

The resin (b-1) had a glass transition temperature (Tg) of 160° C. and a saturated water absorption at 23° C. of 0.3% by weight. Furthermore, measurement of an intrinsic viscosity ($\eta_{inh}$) of the resin (b-1) in chloroform at 30° C. resulted in 0.68 dl/g.

Synthesis Example 3

(Synthesis of Norbornene Resin)

A hydrogenated polymer (also referred to as a "resin (c-1)" hereinafter) was obtained in the same manner as in Synthesis Example 1, except that 175 parts of 8-methyl-8-methoxycarbonyltetracyclo[4.4.0.1$^{2,5}$.1$^{7,10}$]dodec-3-ene, 75 parts of 1,4-methano-1,4,4a,9a-tetrahydrofluorene (another name: 1H,4H,4aH,9aH-1,4-methanofluorene) and 25 parts of bicyclo[2.2.1]hept-2-ene were used as monomers.

A hydrogenation ratio of the resulting resin (c-1) was measured by a $^1$H-NMR spectrum under the condition of 400 MHz, and as a result, it was 99.9%. Further, it was observed that the aromatic ring had not been substantially hydrogenated.

Furthermore, a number-average molecular weight (Mn) and a weight-average molecular weight (Mw) in terms of polystyrene of the resin (c-1) were measured by gel permeation chromatography (GPC, column: four columns in series consisting of TSKgel G7000H$_{XL}$×1, TSKgel GMH$_{XL}$×2 and TSKgel G2000H$_{XL}$×1, available from TOSOH CORPORATION, solvent: tetrahydrofuran). As a result, the number-average molecular weight (Mn) was 32,000, the weight-average molecular weight (Mw) was 120,000, and the molecular weight distribution (Mw/Mn) was 3.75.

The resin (c-1) had a glass transition temperature (Tg) of 155° C. and a saturated water absorption at 23° C. of 0.2% by weight. Furthermore, measurement of an intrinsic viscosity ($\eta_{inh}$) of the resin (c-1) in chloroform at 30° C. resulted in 0.61 dl/g.

Synthesis Example 4

(Synthesis of Norbornene Resin)

A hydrogenated polymer (also referred to as a "resin (d-1)" hereinafter) was obtained in the same manner as in Synthesis Example 1, except that 200 parts of 8-methyl-8-methoxycarbonyltetracyclo[4.4.0.1$^{2,5}$.1$^{7,10}$]dodec-3-ene and 50 parts of 1,2-(2H,3H-[1,3]epicyclopenta)-1,2-dihydroacenaphthylene were used as monomers.

A hydrogenation ratio of the resulting resin (d-1) was measured by a $^1$H-NMR spectrum under the condition of 400 MHz, and as a result, it was 99.9%. Further, it was observed that the aromatic ring had not been substantially hydrogenated.

Furthermore, a number-average molecular weight (Mn) and a weight average molecular weight (Mw) in terms of polystyrene of the resin (d-1) were measured by gel permeation chromatography (GPC, column: four columns in series consisting of TSKgel G7000H$_{XL}$×1, TSKgel GMH$_{XL}$×2 and TSKgel G2000H$_{XL}$×1, available from TOSOH CORPORATION, solvent: tetrahydrofuran). As a result, the number-average molecular weight (Mn) was 42,000, the weight-average molecular weight (Mw) was 180,000, and the molecular weight distribution (Mw/Mn) was 4.29. The resin (d-1) had a glass transition temperature (Tg) of 175° C.

Synthesis Example 5

(Synthesis of Norbornene Resin)

A hydrogenated polymer (also referred to as a "resin (e-1)" hereinafter) was obtained in the same manner as in Synthesis Example 1, except that 175 parts of 8-methyl-8-methoxycarbonyltetracyclo[4.4.0.1$^{2,5}$.1$^{7,10}$]dodec-3-ene and 75 parts of tricyclo[5.2.1.0$^{2,6}$]dec-8-ene wherein a molar ratio between endo form and exo form was 95:5 were used as monomers.

A hydrogenation ratio of the resulting resin (e-1) was measured by a $^1$H-NMR spectrum under the condition of 400 MHz, and as a result, it was 99.9%. Further, it was observed that the aromatic ring had not been substantially hydrogenated.

Furthermore, a number-average molecular weight (Mn) and a weight-average molecular weight (Mw) in terms of polystyrene of the resin (e-1) were measured by gel permeation chromatography (GPC, column: four columns in series consisting of TSKgel G7000H$_{XL}$×1, TSKgel GMH$_{XL}$×2 and TSKgel G2000H$_{XL}$×1, available from TOSOH CORPORATION, solvent: tetrahydrofuran). As a result, the number-average molecular weight (Mn) was 19,000, the weight-average molecular weight (Mw) was 75,000, and the molecular weight distribution (Mw/Mn) was 3.7.

The resin (e-1) had a glass transition temperature (Tg) of 155° C. and a saturated water absorption at 23° C. of 0.2% by weight. Furthermore, measurement of an intrinsic viscosity ($\eta_{inh}$) of the resin (e-1) in chloroform at 30° C. resulted in 0.52 dl/g.

Preparation Example 1

(Preparation of Pressure-sensitive Adhesive)

In a reaction vessel, 250 parts of distilled water were placed. To the reaction vessel, 90 parts of butyl acrylate, 8 parts of 2-hydroxyethyl methacrylate, 2 parts of divinylbenzene and 0.1 part of potassium oleate were added. Thereafter, the mixture was stirred by a stirring blade made of Teflon (registered trademark) to perform dispersing treatment. After the reaction vessel was purged with nitrogen, the mixture was heated up to 50° C., and then 0.2 part of potassium persulfate was added to initiate polymerization. After 2 hours from the initiation of polymerization, 0.1 part of potassium persulfate was further added to the polymerization reaction system, then the reaction system was heated up to 80° C., and polymerization reaction was further performed for 1 hour to give a polymer dispersion.

Subsequently, the polymer dispersion was concentrated by the use of an evaporator until the solids concentration became 70% by weight, whereby an aqueous pressure-sensitive adhesive (referred to as a "pressure-sensitive adhesive A" hereinafter) comprising an aqueous dispersion of an acrylic acid ester polymer and having a polar group was obtained.

A number-average molecular weight (Mn) and a weight-average molecular weight (Mw) in terms of polystyrene of the acrylic acid ester polymer to constitute the pressure-sensitive adhesive A obtained above were measured by gel permeation chromatography (GPC, column: four columns in series consisting of TSKgel G7000H$_{XL}$×1, TSKgel GMH$_{XL}$×2 and TSKgel G2000H$_{XL}$×1, available from TOSOH CORPORATION, solvent: tetrahydrofuran). As a result, the number-average molecular weight (Mn) was 69,000, and the weight-average molecular weight (Mw) was 135,000.

Further, an intrinsic viscosity ($\eta_{inh}$) of the pressure-sensitive adhesive A in chloroform at 30° C. was measured, and as a result, it was 1.2 dl/g.

Preparation Example 2

(Preparation of Polyvinyl Alcohol Adhesive)
Completely saponified polyvinyl alcohol having an average degree of polymerization of 1,700 was dissolved in water so that the concentration should become 3% by weight, whereby a polyvinyl alcohol adhesive was obtained.

Production Example 1

(Production of Retardation Film)
The resin (a-1) was dissolved in toluene so that the concentration should become 30% by weight. The resulting solution had a solution viscosity at room temperature of 30,000 mPa·s. To the solution, pentaerythrityl tetrakis[3-(3,5-di-t-butyl-4-hydroxyphenyl)propionate] was added as an antioxidant in an amount of 0.1 part by weight relative to 100 parts by weight of the resin (a-1). The resulting solution was filtered through a metallic fiber sintered filter having a pore size of 5 µm (available from Nihon Pall Ltd.) with controlling a flow rate of the solution so that the differential pressure should be not more than 4 MPa. Thereafter, by the use of "INVEX labocoater" manufactured by Inoue Metalworking Industry Co., Ltd. installed in a clean room of class 1000, the solution was applied onto a PET film of 100 µm thickness ("Lumirror U94" available from Toray Industries, Inc.) having been subjected to hydrophilic treatment (bonding facilitation treatment) with an acrylic acid surface active agent. Subsequently, the resulting liquid layer was subjected to primary drying at 50° C., then subjected to secondary drying at 90° C. and peeled from the PET film to form a resin film having a thickness of 100 µm (also referred to as a "resin film (a-2)" hereinafter). The resulting resin film (a-2) had a residual solvent content of 0.5% by weight and a total light transmittance of 93%.

Further, a resin film having a residual solvent content of 0.4% by weight and a thickness of 80 µm (also referred to as a "resin film (a-3)" hereinafter) and a resin film having a residual solvent content of 0.3% by weight and a thickness of 50 µm (also referred to as a "resin film (a-4)" hereinafter) were prepared in the same manner as above. Each of the resin film (a-3) and the resin film (a-4) had a total light transmittance of 93%.

The resulting resin film (a-2) was heated at 140° C. (Tg+10° C.) in a tenter, then stretched to 1.3 times in the lengthwise direction of the film surface at a stretching rate of 300%/min and then stretched to 1.3 times in the crosswise direction of the film surface. Thereafter, the film was cooled with holding the film in this state in an atmosphere of 110° C. (Tg−20° C.) for 1 minute, then further cooled at room temperature and taken out of the tenter to give a retardation film (also referred to as a "retardation film (a-5)" hereinafter)

The resulting retardation film (a-5) was measured on a retardation α(550), a retardation β(550) and a film thickness. The results are set forth in Table 1.

Separately, the resin film (a-3) was heated at 140° C. (Tg+10° C.) in a tenter, then stretched to 1.3 times in the lengthwise direction of the film surface at a stretching rate of 300%/min with keeping the width in the crosswise direction of the film surface at constant. Thereafter, the film was cooled with holding the film in this state in an atmosphere of 110° C. (Tg−20° C.) for 1 minute, then further cooled at room temperature and taken out of the tenter to give a retardation film (also referred to as a "retardation film (a-6)" hereinafter).

The resulting retardation film (a-6) was measured on a retardation α(550), a retardation β(550) and a film thickness. The results are set forth in Table 1.

Separately, the resin film (a-4) was heated at 140° C. (Tg+10° C.) in a tenter, then stretched to 1.1 times in the lengthwise direction of the film surface at a stretching rate of 300%/min and then stretched to 1.1 times in the crosswise direction of the film surface. Thereafter, the resin film was cooled with holding the film in this state in an atmosphere of 110° C. (Tg−20° C.) for 1 minute, then further cooled at room temperature and taken out of the tenter to give a retardation film (also referred to as a "retardation film (a-7)" hereinafter).

The resulting retardation film (a-7) was measured on a retardation α(550), a retardation β(550) and a film thickness. The results are set forth in Table 1.

Production Examples 2 to 5

(Production of Retardation Film)
Resin films (b-2) to (e-2) each having a thickness of 100 µm, resin films (b-3) to (e-3) each having a thickness of 80 µm and resin films (b-4) to (e-4) each having a thickness of 50 µm were each obtained in the same manner as in Production Example 1, except that the resins (b-1) to (e-1) shown in Table 1 were each used instead of the resin (a-1). The residual solvent content, film thickness and total light transmittance of the resulting films are set forth in Table 1.

Further, retardation films were obtained in the same manner as in Production Example 1, except that the resin films (b-2) to (e-2) each having a thickness of 100 µm were each used instead of the resin film (a-2), the resin films (b-3) to (e-3) each having a thickness of 80 µm were each used instead of the resin film (a-3), the resin films (b-4) to (e-4) each having a thickness of 50 µm were each used instead of the resin film (a-4), and the stretching temperature was changed as shown in Table 1.

The resulting retardation films were measured on a retardation α(550), a retardation β(550) and a film thickness. The results are set forth in Table 1.

Production Example 6

(Production of Retardation Film)
Retardation films (a-5), (a-6) and (a-7) were each produced in the same manner as in Production Example 1. Thereafter, both surfaces of each of the resulting retardation films (a-5), (a-6) and (a-7) were subjected to corona treatment in the atmosphere under such condition that the irradiation dose of the corona discharge electron became 100 W/m$^2$/min, to give retardation films (a-5'), (a-6') and (a-7'). The resulting retardation films (a-5'), (a-6') and (a-7') were measured on a retardation α(550), a retardation β(550) and a film thickness. The results are set forth in Table 1.

Comparative Production Example 1

(Production of Retardation Film for Comparison)

A resin film having a residual solvent content of 0.4% by weight and a thickness of 100 μm (also referred to as a "resin film (f-2)" hereinafter), a resin film having a residual solvent content of 0.3% by weight and a thickness of 80 μm (also referred to as a "resin film (f-3)" hereinafter) and a resin film having a residual solvent content of 0.3% by weight and a thickness of 50 μm (also referred to as a "resin film (f-4)" hereinafter) were each obtained in the same manner as in Production Example 1, except that a polycarbonate resin "A2700" (Tg=155° C.) available from Idemitsu Petrochemical Co., Ltd. was used instead of the resin (a-1) and methylene chloride was used instead of toluene. Each of the resulting resin films (f-2) to (f-4) had a total light transmittance of 91%.

The resulting resin film (f-2) was heated at 165° C. (Tg+ 10° C.) in a tenter, then stretched to 1.03 times in the lengthwise direction of the film surface at a stretching rate of 300%/ min and then stretched to 1.03 times in the crosswise direction of the film surface. Thereafter, the film was cooled with holding the film in this state in an atmosphere of 135° C. (Tg−20° C.) for 1 minute, then further cooled at room temperature and taken out of the tenter to give a retardation film (also referred to as a "retardation film (f-5)" hereinafter).

The resulting retardation film (f-5) was measured on a retardation α(55), a retardation β(550) and a film thickness. The results are set forth in Table 1.

Separately, the resin film (f-3) was heated at 165° C. (Tg+ 10° C.) in a tenter, then stretched to 1.03 times in the lengthwise direction of the film surface at a stretching rate of 300%/ min with keeping the width in the crosswise direction of the film surface at constant. Thereafter, the film was cooled with holding the film in this state in an atmosphere of 135° C. (Tg−20° C.) for 1 minute, then further cooled at room temperature and taken out of the tenter to give a retardation film (also referred to as a "retardation film (f-6)" hereinafter).

The resulting retardation film (f-6) was measured on a retardation α(550), a retardation β(550) and a film thickness. The results are set forth in Table 1.

Separately, the resin film (f-4) was heated at 165° C. (Tg+ 10° C.) in a tenter, then stretched to 1.01 times in the lengthwise direction of the film surface at a stretching rate of 300%/ min and then stretched to 1.01 times in the crosswise direction of the film surface. Thereafter, the film was cooled with holding the film in this state in an atmosphere of 135° C. (Tg−20° C.) for 1 minute, then further cooled at room temperature and taken out of the tenter to give a retardation film (also referred to as a "retardation film (f-7)" hereinafter).

The resulting retardation film (f-7) was measured on a retardation α(550), a retardation β(550) and a film thickness. The results are set forth in Table 1.

TABLE 1

| | | Resin film | | | | Retardation film | | | | |
|---|---|---|---|---|---|---|---|---|---|---|
| | Type of resin | Type | Solvent content (wt %) | Film thickness (μm) | Total light transmittance (%) | Type | Streching temp. (° C.) | Holding temp. (° C.) | Film thickness (μm) | α (550) (nm) | β (550) (nm) |
| Prod. Ex.1 | a-1 | a-2 | 0.5 | 100 | ≧93 | a-5 | 140 | 110 | 56 | 1 | 210 |
| | | a-3 | 0.4 | 80 | ≧93 | a-6 | | | 45 | 99 | 46 |
| | | a-4 | 0.3 | 50 | ≧93 | a-7 | | | 43 | 1 | 30 |
| Prod. Ex.2 | b-1 | b-2 | 0.4 | 100 | ≧93 | b-5 | 170 | 140 | 57 | 1 | 243 |
| | | b-3 | 0.3 | 80 | ≧93 | b-6 | | | 44 | 103 | 73 |
| | | b-4 | 0.3 | 50 | ≧93 | b-7 | | | 44 | 2 | 27 |
| Prod. Ex.3 | c-1 | c-2 | 0.4 | 100 | ≧93 | c-5 | 165 | 135 | 56 | 1 | 240 |
| | | c-3 | 0.3 | 80 | ≧93 | c-6 | | | 45 | 98 | 75 |
| | | c-4 | 0.3 | 50 | ≧93 | c-7 | | | 42 | 1 | 33 |
| Prod. Ex.4 | d-1 | d-2 | 0.4 | 100 | ≧93 | d-5 | 185 | 155 | 57 | 2 | 244 |
| | | d-3 | 0.3 | 80 | ≧93 | d-6 | | | 46 | 96 | 74 |
| | | d-4 | 0.3 | 50 | ≧93 | d-7 | | | 42 | 3 | 35 |
| Prod. Ex.5 | e-1 | e-2 | 0.4 | 100 | ≧93 | e-5 | 165 | 135 | 55 | 1 | 241 |
| | | e-3 | 0.3 | 80 | ≧93 | e-6 | | | 44 | 100 | 76 |
| | | e-4 | 0.3 | 50 | ≧93 | e-7 | | | 42 | 1 | 29 |
| Prod. Ex.6 | a-1 | a-2 | 0.5 | 100 | ≧93 | a-5' | 140 | 110 | 56 | 1 | 210 |
| | | a-3 | 0.4 | 80 | ≧93 | a-6' | | | 45 | 99 | 46 |
| | | a-4 | 0.3 | 50 | ≧93 | a-7' | | | 43 | 1 | 30 |
| Comp. Prod. Ex.1 | PC | f-2 | 0.4 | 100 | 91 | f-5 | 165 | 135 | 92 | 1 | 210 |
| | | f-3 | 0.3 | 80 | 91 | f-6 | | | 77 | 99 | 47 |
| | | f-4 | 0.3 | 50 | 91 | f-7 | | | 48 | 3 | 28 |

PC: polycarbonate resin (A2700)

Production Example 7

Comparative Production Example 2

A solution obtained by diluting HYDRAN WLS-201 (available from DAINIPPON INK AND CHEMICALS, INC.) which is a polyether polyurethane material to 3% by weight with methanol was applied to one surface of each of the retardation films obtained in Production Examples 1 to 6 and Comparative Production Example 1 by means of a wire bar having a gap of 12 μm and then dried by heating at 80° C. for 5 minutes, whereby optical films (retardation films) each having a polyurethane layer were obtained.

The resulting retardation films were measured on a retardation α(550), a retardation β(550) and a film thickness. As a result, change of film thickness and change of retardation were not observed though the polyurethane layer was provided. The results are set forth in Table 2.

Production Example 8

On one surface of each of the retardation films (a-5), (a-6) and (a-7) obtained in Production Example 1, a polyurethane layer was formed in the same manner as in Production Example 7, except that HYDRAN AP-20 (available from DAINIPPON INK AND CHEMICALS, INC.) which is a polyester polyurethane material was used, whereby optical films (retardation films) (A-8), (A-9) and (A-10) each having a polyurethane layer were obtained.

The resulting retardation films were measured on a retardation α(550), a retardation β(550) and a film thickness. As a result, change of film thickness and change of retardation were not observed though the polyurethane layer was provided. The results are set forth in Table 2.

TABLE 2

|  | Retardation film | Optical film having polyurethane layer ||||
|---|---|---|---|---|---|
|  |  | Type | Film thickness (μm) | α (550) (nm) | β (550) (nm) |
| Prod. Ex.7 | a-5 | A-5 | 56 | 2 | 209 |
|  | a-6 | A-6 | 45 | 98 | 46 |
|  | a-7 | A-7 | 43 | 1 | 30 |
|  | b-5 | B-5 | 57 | 1 | 243 |
|  | b-6 | B-6 | 44 | 103 | 73 |
|  | b-7 | B-7 | 44 | 2 | 27 |
|  | c-5 | C-5 | 56 | 1 | 241 |
|  | c-6 | C-6 | 45 | 98 | 75 |
|  | c-7 | C-7 | 42 | 1 | 33 |
|  | d-5 | D-5 | 57 | 2 | 243 |
|  | d-6 | D-6 | 46 | 96 | 73 |
|  | d-7 | D-7 | 42 | 3 | 35 |
|  | e-5 | E-5 | 55 | 1 | 241 |
|  | e-6 | E-6 | 44 | 99 | 76 |
|  | e-7 | E-7 | 42 | 1 | 29 |
|  | a-5' | A-5' | 56 | 2 | 209 |
|  | a-6' | A-6' | 45 | 98 | 46 |
|  | a-7' | A-7' | 43 | 1 | 30 |
| Prod. Ex. 8 | a-5 | A-8 | 56 | 2 | 209 |
|  | a-6 | A-9 | 45 | 98 | 46 |
|  | a-7 | A-10 | 43 | 1 | 30 |
| Comp. Prod. Ex.2 | f-5 | F-5 | 92 | 1 | 210 |
|  | f-6 | F-6 | 77 | 99 | 48 |
|  | f-7 | F-7 | 48 | 2 | 28 |

Production Example A (Production of Polarizing Film (Polarizer))

In a dyeing bath made of an aqueous solution of iodine and potassium iodide having an iodine concentration of 0.03% by weight and a potassium iodide concentration of 0.5% by weight and having a temperature of 30° C., polyvinyl alcohol (abbreviated to "PVA" hereinafter) was subjected to pre-stretching in a stretch ratio of 3 times. Then, in a crosslinking bath made of an aqueous solution of boric acid and potassium iodide having an boric acid concentration of 5% by weight and a potassium iodide concentration of 8% by weight and having a temperature of 55° C., the PVA was subjected to post-stretching in a stretch ratio of 2 times, followed by drying. Thus, a polarizing film (also referred to as a "polarizer (1)" hereinafter) was obtained.

Examples 1 to 12

Comparative Examples 1 and 2

To both surfaces of the polarizer obtained in Production Example A, the retardation films each having a polyurethane layer, which had been obtained in Production Examples 7 and 8 and Comparative Production Example 2, were bonded in accordance with the combination shown in Table 3 in such a manner that the surface of the polarizer (1) and the polyurethane layer were brought into contact with each other through the pressure-sensitive adhesive A, whereby polarizing plates were produced.

Each of the resulting polarizing plates had a total light transmittance of 44.0% and a degree of polarization of 99.9%. Further, adhesion properties of the polarizing plates were evaluated, and as a result, in all the polarizing plates, delamination between the polarizer and the retardation film did not take place, and material failure only took place. After the polarizing plates were stored under wet heat or dry heat, adhesion properties were evaluated. The results are set forth in Table 3.

Separately, after the polarizing plates were stored under wet heat or dry heat, the polarizer was separated from the retardation film by means of an ophthalmic knife (available from FEATHER Safety Razor Co., Ltd.), and the polarizer and the retardation film separated were measured on a retardation. The results are set forth in Table 4.

Examples 13 and 14

Polarizing plates were prepared in the same manner as in Examples 1 and 2, except that the polyvinyl alcohol adhesive obtained in Preparation Example 2 was used instead of the pressure-sensitive adhesive A and the retardation films (A-5'), (A-6') and (A-7') each having a polyurethane layer, which had been obtained in Production Example 7, were used as the retardation films in accordance with the combination shown in Table 3.

Each of the resulting polarizing plates had a total light transmittance of 44.0% and a degree of polarization of 99.9%. Further, adhesion properties of the polarizing plates were evaluated, and as a result, in all the polarizing plates, delamination between the polarizer and the retardation film did not take place, and material failure only took place. After the polarizing plates were stored under wet heat or dry heat, adhesion properties were evaluated. The results are set forth in Table 3.

Separately, after the polarizing plates were stored under wet heat or dry heat, the polarizer was separated from the retardation film by means of an ophthalmic knife (available from FEATHER Safety Razor Co., Ltd.), and the polarizer and the retardation film separated were measured on a retardation. The results are set forth in Table 4.

Example 15

A solution obtained by diluting HYDRAN WLS-201 (available from DAINIPPON INK AND CHEMICALS, INC.) which is a polyether polyurethane material to 3% by weight with methanol was applied to a surface of the retardation film (A-7) obtained in Production Example 7, said surface having no polyurethane layer, by means of a wire bar having a gap of 12 μm and then dried by heating at 80° C. for 5 minutes, whereby a retardation film (A'-7) having polyurethane layers on both surfaces was obtained.

To one surface of the resulting retardation film (A'-7), DeSolite Z7524 (available from JSR Corporation) was applied as a hard coating material by means of a wire bar having a gap of 12 μm, and then it was heated at 80° C. for 3 minutes to remove the solvent. The surface which had been coated with the hard coating material was irradiated with a metal halide lamp having an illuminance of 200 mW/cm$^2$ for 3 seconds to form a hard coating layer. To a surface of the resulting hard coating layer, Opstar JN7102 as a high-refractive index material was applied by means of a wire bar having a gap of 6 μm, and then it was heated at 120° C. for 10 minutes. Onto a surface of the resulting high-refractive index layer, Opstar JN7212 as a low-refractive index material was further applied by means of a wire bar having a gap of 6 μm, and then it was heated at 120° C. for 10 minutes to perform curing, whereby an antireflection film was formed.

A polarizing plate was produced in the same manner as in Example 2, except that the above retardation film (A'-7) with the antireflection film was used instead of the retardation film (A-7). The resulting polarizing plate was evaluated in the same manner as in Example 2. The results are set forth in Table 3 and Table 4.

With respect to adhesion properties of the hard coating layer and the antireflection layer provided outside the polarizing plate, a cross-cut peel test was carried out in accordance with JIS K5600-5-6. As a result, the adhesion properties were classified as Class 0 (edge of each cut is completely smooth, and any square is not peeled), and on any interface among the retardation film, the hard coating layer, the high-refractive index layer and the low-refractive index layer, adhesion was excellent.

Comparative Examples 3 and 4

Polarizing plates were produced in the same manner as in Examples 1 and 2, except that the retardation films (a-5), (a-6) and (a-7) each having no polyurethane layer, which had been obtained in Production Example 1, were used in accordance with the combination shown in Table 3 instead of the retardation films (A-5), (A-6) and (A-7) with the polyurethane layer. Then, the polarizing plates were evaluated in the same manner as in Examples 1 and 2. The results are set forth in Table 3 and Table 4.

TABLE 3

| | Constitution of polarizing plate [1] | | Adhesion properties | | |
|---|---|---|---|---|---|
| | Retardation film 1 | Retardation film 2 | Initial stage | After wet heat storage | After dry heat storage |
| Ex.1 | A-5 | A-7 | A | A | A |
| Ex.2 | A-6 | A-7 | A | A | A |
| Ex.3 | B-5 | B-7 | A | A | A |
| Ex.4 | B-6 | B-7 | A | A | A |
| Ex.5 | C-5 | C-7 | A | A | A |
| Ex.6 | C-6 | C-7 | A | A | A |
| Ex.7 | D-5 | D-7 | A | A | A |
| Ex.8 | D-6 | D-7 | A | A | A |
| Ex.9 | E-5 | E-7 | A | A | A |
| Ex.10 | E-6 | E-7 | A | A | A |
| Ex.11 | A-8 | A-10 | A | B | A |
| Ex.12 | A-9 | A-10 | A | B | A |
| Ex.13 | A-5' | A-7' | A | A | A |
| Ex.14 | A-6' | A-7' | A | A | A |
| Ex.15 | A-6 | A'-7 | A | A | A |
| Comp.Ex.1 | F-5 | F-7 | A | A | A |
| Comp.Ex.2 | F-6 | F-7 | A | A | A |
| Comp.Ex.3 | a-5 | a-7 | A | B | B |
| Comp.Ex.4 | a-6 | a-7 | A | B | B |

[1] Constitution of polarizing plate: retardation film 1/polarizer/retardation film 2

TABLE 4

| Retardation films [1] | | α (550) (nm) | | | β (550) (nm) | | |
|---|---|---|---|---|---|---|---|
| | | Initial stage | After wet heat storage | After dry heat storage | Initial stage | After wet heat storage | After dry heat storage |
| Ex.1 | A-5 | 2 | 2 | 2 | 209 | 209 | 208 |
| | A-7 | 1 | 1 | 1 | 30 | 31 | 30 |
| Ex.2 | A-6 | 98 | 98 | 97 | 46 | 46 | 46 |
| | A-7 | 1 | 1 | 1 | 30 | 29 | 29 |
| Ex.3 | B-5 | 1 | 1 | 1 | 243 | 243 | 243 |
| | B-7 | 2 | 2 | 2 | 27 | 27 | 27 |
| Ex.4 | B-6 | 103 | 103 | 103 | 73 | 73 | 73 |
| | B-7 | 2 | 2 | 1 | 27 | 26 | 28 |
| Ex.5 | C-5 | 1 | 1 | 2 | 241 | 241 | 239 |
| | C-7 | 1 | 1 | 1 | 33 | 33 | 35 |
| Ex.6 | C-6 | 98 | 97 | 97 | 75 | 74 | 75 |
| | C-7 | 1 | 1 | 1 | 33 | 33 | 34 |
| Ex.7 | D-5 | 2 | 2 | 2 | 243 | 240 | 243 |
| | D-7 | 3 | 3 | 3 | 35 | 35 | 35 |
| Ex.8 | D-6 | 96 | 96 | 96 | 73 | 73 | 73 |
| | D-7 | 3 | 3 | 3 | 35 | 34 | 35 |
| Ex.9 | E-5 | 1 | 1 | 1 | 241 | 241 | 242 |
| | E-7 | 1 | 1 | 1 | 29 | 29 | 27 |
| Ex.10 | E-6 | 99 | 99 | 100 | 76 | 75 | 75 |
| | E-7 | 1 | 1 | 1 | 29 | 29 | 27 |
| Ex.11 | A-8 | 2 | 2 | 2 | 209 | 209 | 207 |
| | A-10 | 1 | 1 | 1 | 30 | 31 | 30 |
| Ex.12 | A-9 | 98 | 98 | 97 | 46 | 46 | 46 |
| | A-10 | 1 | 1 | 1 | 30 | 29 | 29 |
| Ex.13 | A-5' | 2 | 2 | 2 | 209 | 208 | 207 |
| | A-7' | 1 | 1 | 1 | 30 | 30 | 30 |
| Ex.14 | A-6' | 98 | 98 | 97 | 46 | 46 | 46 |
| | A-7' | 1 | 1 | 1 | 30 | 29 | 29 |
| Ex.15 | A-6 | 98 | 98 | 97 | 46 | 46 | 46 |
| | A'-7 | 1 | 1 | 1 | 30 | 29 | 29 |
| Comp.Ex.1 | F-5 | 1 | 1 | 1 | 210 | 204 | 205 |
| | F-7 | 2 | 2 | 2 | 28 | 28 | 27 |
| Comp.Ex.2 | F-6 | 99 | 95 | 95 | 48 | 46 | 47 |
| | F-7 | 2 | 2 | 2 | 28 | 27 | 27 |
| Comp.Ex.3 | a-5 | 1 | 1 | 1 | 210 | 210 | 209 |
| | a-7 | 1 | 1 | 1 | 30 | 29 | 30 |
| Comp.Ex.4 | a-6 | 99 | 97 | 99 | 46 | 46 | 46 |
| | a-7 | 1 | 1 | 1 | 30 | 30 | 30 |

[1] Upper: Retardation film 1, Lower: Retardation film 2 Constitution of polarizing plate: retardation film 1/polarizer/retardation film 2

Synthesis Example 6

(Synthesis of Polyurethane Resin)

500 parts of polytetramethylene glycol (molecular weight: 1000), 36 parts of polymethacrylic acid, 206 parts of isophorone diisocyanate, 13 parts of 80 wt % hydrated hydrazine and 27 parts of triethylamine were reacted to give a polyurethane resin (also referred to as a "polyurethane resin (P-1)" hereinafter) having a weight-average molecular weight (in terms of polystyrene), as measured by GPC, of 120,000.

Synthesis Example 7

(Synthesis of Polyurethane Resin)
A polyurethane resin (also referred to as a "polyurethane resin (P-2)" hereinafter) having a weight-average molecular weight (in terms of polystyrene) of 120,000 was obtained in the same manner as in Synthesis Example 6, except that 103 parts of polytetramethylene glycol (molecular weight: 2000) were used instead of polytetramethylene glycol (molecular weight: 1000).

Synthesis Example 8

(Synthesis of Polyurethane Resin)
A polyurethane resin (also referred to as a "polyurethane resin (P-3)" hereinafter) having a weight-average molecular weight (in terms of polystyrene) of 120,000 was obtained in the same manner as in Synthesis Example 6, except that 206 parts of polyhexamethylene glycol (molecular weight: 1000) were used instead of polytetramethylene glycol (molecular weight: 1000).

Preparation Example 3

(Preparation of Polyurethane Composition)
100 Parts by weight of the polyurethane resin (P-1) obtained in Synthesis Example 6, 1995 parts by weight of methyl ethyl ketone and 5 parts by weight of polyethylene glycol diglycidyl ether (molecular weight: 700) were mixed and stirred to give a polyurethane composition (1) as a homogeneous solution.

Preparation Examples 4 and 5

(Preparation of Polyurethane Composition)
A polyurethane composition (2) and a polyurethane composition (3) were each obtained in the same manner as in Preparation Example 3, except that the polyurethane resin (P-2) or the polyurethane resin (P-3) was used instead of the polyurethane resin (P-1).

Preparation Example 6

(Preparation of Polyurethane Composition)
100 parts by weight of HYDRAN WLS-201 (available from DAINIPPON INK-AND CHEMICALS, INC.), 633 parts by weight of methyl ethyl ketone and 1.75 parts by weight of polyethylene glycol diglycidyl ether were mixed and stirred to give a polyurethane composition (4) as a homogeneous solution.

Production Example 9

One surface of each of the retardation films (a-5), (a-6) and (a-7) produced in Production Example 1 was subjected to corona treatment in the atmosphere under the conditions of an irradiation dose of corona discharge electron of 100 W/m$^2$/min, to give retardation films (a-5"), (a-6") and (a-7"). To the corona treatment surface of each of the retardation films having been subjected to corona treatment, the polyurethane composition (1) obtained in Preparation Example 3 was applied by means of a wire bar having a gap of 12 μm, and then it was dried by heating at 80° C. for 5 minutes, whereby retardation films (5-1), (6-1) and (7-1) each having a polyurethane layer were obtained.
The resulting retardation films were measured on a retardation α(550), a retardation β(550) and a film thickness. As a result, change of film thickness and change of retardation were not observed though the polyurethane layer was provided. The results are set forth in Table 5.

Production Example 10

Retardation films (5-2), (6-2) and (7-2) each having a polyurethane layer were obtained in the same manner as in Production Example 9, except that the polyurethane composition (2) was used instead of the polyurethane composition (1).
The resulting retardation films were measured on a retardation α(550), a retardation β(550) and a film thickness. As a result, change of film thickness and change of retardation were not observed though the polyurethane layer was provided. The results are set forth in Table 5.

Production Example 11

Retardation films (5-3), (6-3) and (7-3) each having a polyurethane layer were obtained in the same manner as in Production Example 9, except that the polyurethane composition (3) was used instead of the polyurethane composition (1).
The resulting retardation films were measured on a retardation α(550), a retardation β(550) and a film thickness. As a result, change of film thickness and change of retardation were not observed though the polyurethane layer was provided. The results are set forth in Table 5.

Production Example 12

Retardation films (5-4), (6-4) and (7-4) each having a polyurethane layer were obtained in the same manner as in Production Example 9, except that the polyurethane composition (4) was used instead of the polyurethane composition (1).
The resulting retardation films were measured on a retardation α(550), a retardation β(550) and a film thickness. As a result, change of film thickness and change of retardation were not observed though the polyurethane layer was provided. The results are set forth in Table 5.

TABLE 5

| | | | Optical film having polyurethane layer | | |
|---|---|---|---|---|---|
| Polyurethane composition | Retardation film | Type | Film thickness (μm) | α (550) (nm) | β (550) (nm) |
| Prod. Ex.9 (1) | a-5 | 5-1 | 56 | 2 | 209 |
| | a-6 | 6-1 | 45 | 98 | 46 |
| | a-7 | 7-1 | 43 | 1 | 30 |
| Prod. Ex.10 (2) | a-5 | 5-2 | 56 | 2 | 209 |
| | a-6 | 6-2 | 45 | 98 | 46 |
| | a-7 | 7-2 | 43 | 1 | 30 |
| Prod. Ex.11 (3) | a-5 | 5-3 | 56 | 2 | 209 |
| | a-6 | 6-3 | 45 | 98 | 46 |
| | a-7 | 7-3 | 43 | 1 | 30 |
| Prod. Ex.12 (4) | a-5 | 5-4 | 56 | 2 | 209 |
| | a-6 | 6-4 | 45 | 9 | 46 |
| | a-7 | 7-4 | 43 | 1 | 30 |

Examples 16 and 17

Polarizing plates were obtained in the same manner as in Examples 1 and 2, except that the polyvinyl alcohol adhesive obtained in Preparation Example 2 was used as an adhesive and the retardation films (5-1), (6-1) and (7-1), which had been obtained in Production Example 9, were used as the retardation films in accordance with the combination shown in Table 6.

Each of the resulting polarizing plates had a total light transmittance of 44.0% and a degree of polarization of 99.9%. Further, adhesion properties of the resulting polarizing plates were evaluated, and as a result, in all the polarizing plates, delamination between the polarizer and the retardation film did not take place, and material failure only took place. After the polarizing plates were stored under wet heat or dry heat, adhesion properties were evaluated. The results are set forth in Table 6.

Separately, after the polarizing plates were stored under wet heat or dry heat, the polarizer was separated from the retardation film by means of an ophthalmic knife (available from FEATHER Safety Razor Co., Ltd.), and the polarizer and the retardation film separated were measured on a retardation. The results are set forth in Table 6.

Examples 18 and 19

Polarizing plates were obtained in the same manner as in Examples 16 and 17, except that the retardation films (5-2), (6-2) and (7-2) were used in accordance with the combination shown in Table 6 instead of the retardation films (5-1), (6-1) and (7-1).

Each of the resulting polarizing plates had a total light transmittance of 44.0% and a degree of polarization of 99.9%. Further, adhesion properties of the resulting polarizing plates were evaluated, and as a result, in all the polarizing plates, delamination between the polarizer and the retardation film did not take place, and material failure only took place. After the polarizing plates were stored under wet heat or dry heat, adhesion properties were evaluated. The results are set forth in Table 6.

Separately, after the polarizing plates were stored under wet heat or dry heat, the polarizer was separated from the retardation film by means of an ophthalmic knife (available from FEATHER Safety Razor Co., Ltd.), and the polarizer and the retardation film separated were measured on a retardation. The results are set forth in Table 6.

Examples 20 and 21

Polarizing plates were obtained in the same manner as in Examples 16 and 17, except that the retardation films (5-3), (6-3) and (7-3) were used in accordance with the combination shown in Table 6 instead of the retardation films (5-1), (6-1) and (7-1).

Each of the resulting polarizing plates had a total light transmittance of 44.0% and a degree of polarization of 99.9%. Further, adhesion properties of the resulting polarizing plates were evaluated, and as a result, in all the polarizing plates, delamination between the polarizer and retardation film did not take place, and material failure only took place. After the polarizing plates were stored under wet heat or dry heat, adhesion properties were evaluated. The results are set forth in Table 6.

Separately, after the polarizing plates were stored under wet heat or dry heat, the polarizer was separated from the retardation film by means of an ophthalmic knife (available from FEATHER Safety Razor Co., Ltd.), and the polarizer and the retardation film separated were measured on a retardation. The results are set forth in Table 6.

Examples 22 and 23

Polarizing plates were obtained in the same manner as in Examples 16 and 17, except that the retardation films (5-4), (6-4) and (7-4) were used in accordance with the combination shown in Table 6 instead of the retardation films (5-1), (6-1) and (7-1).

Each of the resulting polarizing plates had a total light transmittance of 44.0% and a degree of polarization of 99.9%. Further, adhesion properties of the polarizing plates were evaluated, and as a result, in all the polarizing plates, delamination between the polarizer and the retardation film did not take place, and material failure only took place. After the polarizing plates were stored under wet heat or dry heat, adhesion properties were evaluated. The results are set forth in Table 6.

Separately, after the polarizing plates were stored under wet heat or dry heat, the polarizer was separated from the retardation film by means of an ophthalmic knife (available from FEATHER Safety Razor Co., Ltd.), and the polarizer and the retardation film separated were measured on a retardation. The results are set forth in Table 6.

TABLE 6

| | | Adhesion properties | | | α (550) (nm) | | | β (550) (nm) | | |
|---|---|---|---|---|---|---|---|---|---|---|
| | Retardation films [1] | Initial stage | After wet heat storage | After dry heat storage | Initial stage | After wet heat storage | After dry heat storage | Initial stage | After wet heat storage | After dry heat storage |
| Ex.16 | 5-1 | A | A | A | 2 | 2 | 2 | 209 | 209 | 209 |
| | 7-1 | | | | 1 | 1 | 1 | 30 | 30 | 30 |
| Ex.17 | 6-1 | A | A | A | 98 | 98 | 96 | 46 | 46 | 46 |
| | 7-1 | | | | 1 | 1 | 1 | 30 | 30 | 30 |
| Ex.18 | 5-2 | A | A | A | 2 | 2 | 2 | 209 | 209 | 209 |
| | 7-2 | | | | 1 | 1 | 1 | 30 | 30 | 30 |
| Ex.19 | 6-2 | A | A | A | 98 | 98 | 97 | 46 | 46 | 46 |
| | 7-2 | | | | 1 | 1 | 1 | 30 | 30 | 30 |
| Ex.20 | 5-3 | A | A | A | 2 | 2 | 2 | 209 | 209 | 209 |
| | 7-3 | | | | 1 | 1 | 1 | 30 | 31 | 30 |
| Ex.21 | 6-3 | A | A | A | 98 | 98 | 97 | 46 | 46 | 46 |
| | 7-3 | | | | 1 | 1 | 1 | 30 | 31 | 30 |

TABLE 6-continued

|  | Retardation films [1] | Adhesion properties | | | α (550) (nm) | | | β (550) (nm) | | |
|---|---|---|---|---|---|---|---|---|---|---|
|  |  | Initial stage | After wet heat storage | After dry heat storage | Initial stage | After wet heat storage | After dry heat storage | Initial stage | After wet heat storage | After dry heat storage |
| Ex.22 | 5-4 | A | A | A | 2 | 2 | 2 | 209 | 209 | 209 |
|  | 7-4 |  |  |  | 1 | 1 | 1 | 30 | 30 | 30 |
| Ex.23 | 6-4 | A | A | A | 98 | 98 | 97 | 46 | 46 | 46 |
|  | 7-4 |  |  |  | 1 | 1 | 1 | 30 | 30 | 30 |

[1] Upper: Retardation film 1, Lower: Retardation film 2 Constitution of polarizing plate: retardation film 1/polarizer/retardation film 2

The invention claimed is:

1. A polarizing plate, wherein a norbornene resin film, a polyurethane layer, an adhesive layer and a polarizing film are laminated in this order, wherein the norbornene resin film is a retardation film that has been uniaxially or biaxially stretched such that the norbornene resin film has birefringence properties; wherein the norbornene resin has a saturated water absorption of no more than 1% by weight in accordance with ASTM D570.

2. The polarizing plate as claimed in claim 1, wherein the norbornene resin film comprises a resin obtained by (co)polymerizing a monomer comprising at least one compound represented by the following formula:

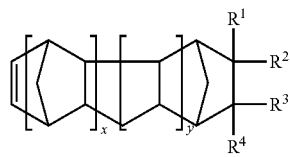

(1)

wherein $R^1$ to $R^4$ are each independently a hydrogen atom, a halogen atom or a monovalent group which may contain oxygen, nitrogen, sulfur or silicon; $R^1$ and $R^2$, or $R^3$ and $R^4$ may be bonded to each other to form an alkylidene group, or $R^1$ and $R^2$, $R^3$ and $R^4$, or $R^2$ and $R^3$ may be bonded to each other to form a mono- or poly-carbocyclic ring or a mono- or poly-heterocyclic ring; and x is 0 or an integer of 1 to 3, and y is 0 or 1, with the proviso that when x is 0, y is also 0.

3. The polarizing plate as claimed in claim 1, wherein the polyurethane layer comprises polyurethane resin obtained by reacting polyether polyol with a polyisocyanate.

4. The polarizing plate as claimed in claim 1, wherein the adhesive layer comprises a polyvinyl alcohol adhesive.

5. A process for producing a polarizing plate comprising steps of:
   forming a polyurethane layer on a surface of a norbornene resin film which is a retardation film that has been uniaxially or biaxially stretched such that the norbornene resin film has birefringence properties, and
   bonding a polarizing film to the polyurethane layer through an adhesive; wherein the norbornene resin has a saturated water absorption of no more than 1% by weight in accordance with ASTM D570.

6. The process for producing a polarizing plate as claimed in claim 5, further comprising a step of subjecting the surface of the norbornene resin film to corona discharge treatment.

* * * * *